(12) United States Patent
Shramkova et al.

(10) Patent No.: US 11,573,356 B2
(45) Date of Patent: Feb. 7, 2023

(54) DIFFRACTION GRATING COMPRISING DOUBLE-MATERIALS STRUCTURES

(71) Applicant: InterDigital CE Patent Holdings, Paris (FR)

(72) Inventors: Oksana Shramkova, Cesson-Sévigné (FR); Artem Boriskin, Thorigné-Fouillard (FR); Mitra Damghanian, Cesson-Sévigné (FR); Valter Drazic, Betton (FR); Laurent Blonde, Thorigné-Fouillard (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 16/980,307

(22) PCT Filed: Mar. 7, 2019

(86) PCT No.: PCT/EP2019/055679
§ 371 (c)(1),
(2) Date: Sep. 11, 2020

(87) PCT Pub. No.: WO2019/175010
PCT Pub. Date: Sep. 19, 2019

(65) Prior Publication Data
US 2021/0041609 A1 Feb. 11, 2021

(30) Foreign Application Priority Data
Mar. 13, 2018 (EP) .................................. 18305263

(51) Int. Cl.
*G02B 5/18* (2006.01)
*G02B 27/42* (2006.01)

(52) U.S. Cl.
CPC ....... *G02B 5/1809* (2013.01); *G02B 27/4244* (2013.01)

(58) Field of Classification Search
CPC ...... G02B 5/18; G02B 5/1809; G02B 5/1814; G02B 5/1819; G02B 5/1866; G02B 5/503;
(Continued)

(56) References Cited

U.S. PATENT DOCUMENTS

| | | |
|---|---|---|
| 3,718,383 A | 2/1973 | Moore |
| 6,099,146 A | 8/2000 | Imamura |

(Continued)

FOREIGN PATENT DOCUMENTS

| | | |
|---|---|---|
| CN | 1606704 A | 4/2005 |
| CN | 1661478 A | 8/2005 |

(Continued)

OTHER PUBLICATIONS

Kotlyar et al (Photonic nanojets generated using square-profile microsteps, vol. 53, No. 24, Applied Optics, pp. 5322-5329, pub date : Aug. 20, 2014) (Year: 2014).*

(Continued)

*Primary Examiner* — Jade R Chwasz
*Assistant Examiner* — Jyotsna V Dabbi
(74) *Attorney, Agent, or Firm* — Invention Mine LLC

(57) ABSTRACT

A diffraction grating includes a plurality of grating unit cells positioned in a periodic array on a substrate surface. In cross-section, a grating unit cell includes a homogeneous dielectric host medium with a first refractive index $n_1$, embedding at least a first block of a first dielectric material with a second refractive index $n_2$, a side edge of which is in direct contact with at least a second block of a second dielectric material with a third refractive index $n_3$. Both the first block and the second block have a trapezoidal cross-section. The plurality of grating unit cells provides a non-symmetrical response for positive first diffraction order and negative first diffraction order based on nanojet hot spot (Continued)

Figure 1:
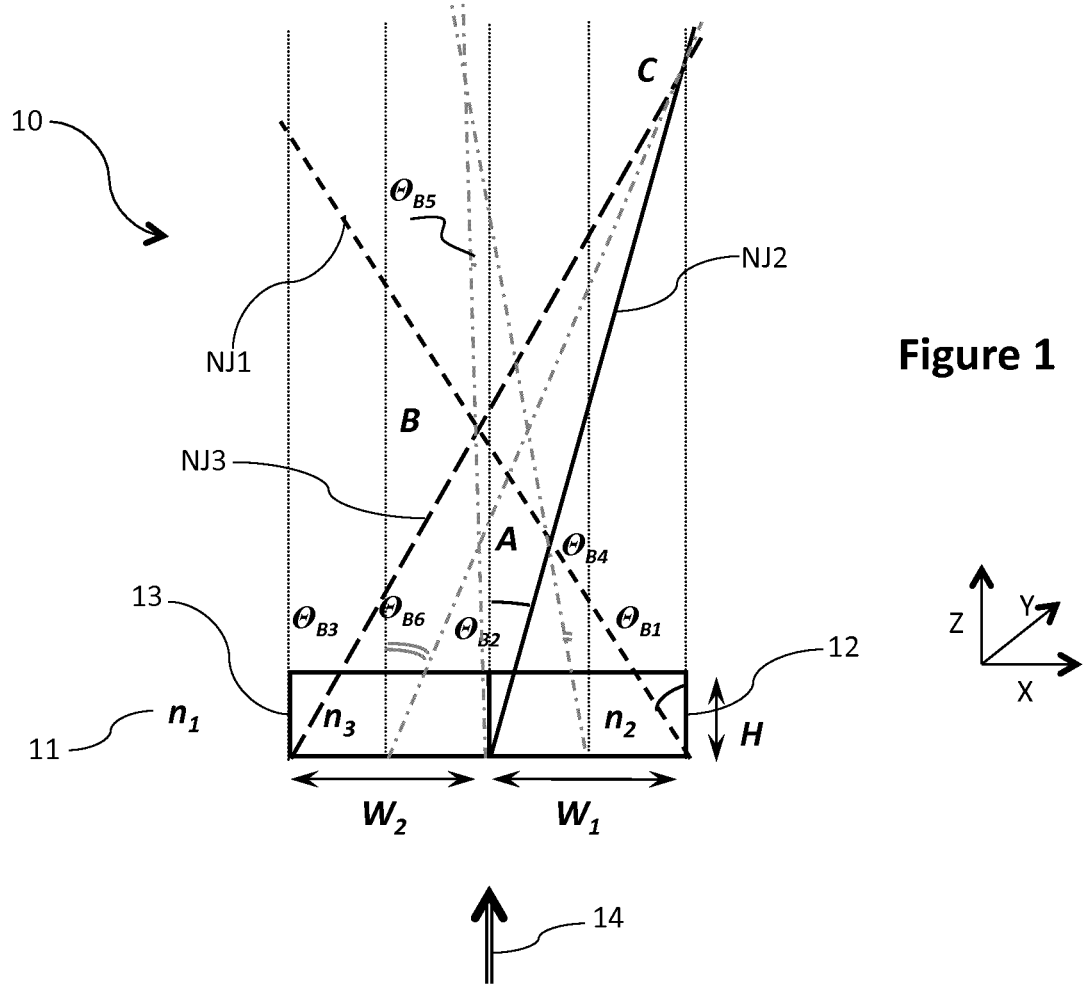

positions, the nanojets being generated at edges between dielectric materials with different refractive indexes.

17 Claims, 18 Drawing Sheets

(58) Field of Classification Search
CPC .............. G02B 27/42; G02B 27/4233; G02B 27/4244; G02B 27/56; G02B 27/0955; G02B 27/09; G02B 1/00; G02B 1/002; G02B 3/00; G02B 3/0006; G02B 3/0037; G02B 2003/0093; G02B 5/1013; G02B 27/4272; G02B 2207/101; G02B 26/0808; G02B 3/005; B82Y 30/00; B82Y 20/00; B82Y 10/00; B82Y 40/00
USPC ........................................................ 359/569
See application file for complete search history.

(56) References Cited

U.S. PATENT DOCUMENTS

| | | | |
|---|---|---|---|
| 7,394,535 | B1 | 7/2008 | Chen |
| 8,885,997 | B2 | 11/2014 | Nguyen |
| 9,099,370 | B2 | 8/2015 | Nishiwaki |
| 9,140,602 | B2 | 9/2015 | Narasimhan |
| 9,383,582 | B2 | 7/2016 | Tang |
| 9,419,036 | B2 | 8/2016 | Saitou |
| 9,564,469 | B2 | 2/2017 | Kim |
| 9,766,467 | B2 | 9/2017 | Sohn |
| 9,891,436 | B2 | 2/2018 | Wall |
| 10,534,115 | B1 | 1/2020 | Calafiore |
| 10,866,360 | B2 * | 12/2020 | Khorasaninejad ..... G02B 6/107 |
| 11,204,452 | B2 * | 12/2021 | Paniagua Dominguez ................. G02B 5/1809 |
| 2005/0002611 | A1 | 1/2005 | Levola |
| 2006/0124833 | A1 | 6/2006 | Toda |
| 2009/0190094 | A1 | 7/2009 | Watanabe |
| 2011/0235166 | A1 | 9/2011 | Zhu |
| 2013/0099343 | A1 | 4/2013 | Toshikiyo |
| 2013/0250421 | A1 | 9/2013 | Wakabayashi |
| 2013/0322810 | A1 | 12/2013 | Robbins |
| 2015/0063753 | A1 | 3/2015 | Evans |
| 2015/0286060 | A1 | 10/2015 | Roh |
| 2015/0323800 | A1 | 11/2015 | Nam |
| 2015/0362641 | A1 * | 12/2015 | Boyraz ................ G02B 5/1871 359/571 |
| 2016/0054172 | A1 | 2/2016 | Roh |
| 2016/0064172 | A1 | 3/2016 | Kirbawy |
| 2016/0070062 | A1 | 3/2016 | Lipson |
| 2016/0231568 | A1 | 8/2016 | Saarikko |
| 2017/0006278 | A1 | 1/2017 | Vandame |
| 2017/0012078 | A1 | 1/2017 | Han |
| 2017/0090206 | A1 | 3/2017 | Kim |
| 2017/0092668 | A1 | 3/2017 | Kim |
| 2017/0092676 | A1 | 3/2017 | Yun |
| 2017/0097510 | A1 | 4/2017 | Sohn |
| 2017/0098672 | A1 | 4/2017 | Yun |
| 2017/0179178 | A1 | 6/2017 | Park |
| 2017/0212348 | A1 | 7/2017 | Fu |
| 2017/0307886 | A1 | 10/2017 | Stenberg |
| 2017/0315346 | A1 | 11/2017 | Tervo |
| 2018/0113313 | A1 | 4/2018 | Tekolste |
| 2018/0231771 | A1 | 8/2018 | Schuck, III |
| 2019/0101700 | A1 | 4/2019 | Boriskin |
| 2019/0121239 | A1 | 4/2019 | Singh |
| 2021/0041709 | A1 | 2/2021 | Damghanian |

FOREIGN PATENT DOCUMENTS

| | | |
|---|---|---|
| CN | 106331445 A | 1/2017 |
| CN | 106772734 A | 5/2017 |
| CN | 106932845 A | 7/2017 |
| CN | 109073885 A | 12/2018 |
| EP | 1406098 A1 | 4/2004 |
| EP | 1542043 A1 | 6/2005 |
| EP | 2196729 | 6/2010 |
| EP | 2955753 | 12/2015 |
| EP | 3223062 A1 * | 9/2017 ............. B82Y 20/00 |
| EP | 3223062 A1 | 9/2017 |
| EP | 3223063 A1 | 9/2017 |
| EP | 3240046 A1 | 11/2017 |
| EP | 3312646 A1 | 4/2018 |
| EP | 3312660 A1 | 4/2018 |
| EP | 3312674 A1 | 4/2018 |
| EP | 3339938 A1 | 6/2018 |
| EP | 3385219 A1 | 10/2018 |
| EP | 3499278 | 6/2019 |
| EP | 3540479 A1 | 9/2019 |
| EP | 3540499 A1 | 9/2019 |
| EP | 3588150 | 1/2020 |
| EP | 3591700 A1 | 1/2020 |
| EP | 3671293 | 6/2020 |
| EP | 3671322 A1 | 6/2020 |
| GB | 2529003 | 2/2016 |
| WO | 03007032 A1 | 1/2003 |
| WO | 2007031991 A2 | 3/2007 |
| WO | 2009083977 A2 | 7/2009 |
| WO | 2014036537 A1 | 3/2014 |
| WO | 2014044912 | 3/2014 |
| WO | 2017116637 | 7/2017 |
| WO | 2017116637 A1 | 7/2017 |
| WO | 2017131983 | 8/2017 |
| WO | 2017162880 A1 | 9/2017 |
| WO | 2017162882 A1 | 9/2017 |
| WO | 2017180403 | 10/2017 |
| WO | 2017180403 A1 | 10/2017 |
| WO | 2018102582 | 6/2018 |
| WO | 2018102582 A1 | 6/2018 |
| WO | 2018102834 A2 | 6/2018 |
| WO | 2021053182 | 3/2021 |

OTHER PUBLICATIONS

International Preliminary Report on Patentability for PCT/EP2019/063802 dated Dec. 29, 2020, 8 pages.
Genevet, Patrice, et. al., "Recent Advances In Planar Optics: From Plasmonic To Dielectric Metasurfaces". Optica, vol. 4, No. 1, Jan. 2017, pp. 139-152.
Aieta, Francesco, et. al., "Multiwavelength Achromatic Metasurfaces By Dispersive Phase Compensation". Sciencexpress, 2015, (8 pages).
Khorasaninejad, Mohammadreza, et. al., "Achromatic Metasurface Lens At Telecommunication Wavelengths". Nano Letters, 2015, (5 pages).
Deng, Zi-Lan, et. al., "Wide-Angle And High-Efficiency Achromatic Metasurfaces For Visible Light". Optical Express, vol. 24, No. 20 pp. 23118-23128 (12 pages).
Avayu, Ori, et al., "Composite Functional Metasurfaces For Multispectral Achromatic Optics". Nature Communications, 2017, pp. 1-7 (7 pages).
Nishiwaki, Seiji, et. al., "Efficient Colour Splitters for High-Pixel-Density Image Sensors". Nature Photonics, vol. 7, Mar. 2013, pp. 240-246.
International Search Report and Written Opinion of the International Searching Authority for PCT/EP2019/085489, dated Jan. 30, 2020, 11 pages.
Yi, Jianjia, et. al., "Coherent Beam Control With An All-Dielectric Transformation Optics Based Lens". Scientific Reports, vol. 6, No. 1, Jan. 5, 2016, pp. 1-8.
Zhao, Yanhui, et. al., "Beam Bending Via Plasmonic Lenses". Optics Express, vol. 18, No. 22, Oct. 25, 2010, pp. 23458-23465.
Jun, Young Chul, et. al., "Optical Manipulation With Plasmonic Beam Shaping Antenna Structures". Advances in OptoElectronicsm, (2012).
Khorasaninejad, Mohammadreza, et. al., "Super-Dispersive Off-Axis Meta-Lenses For Compact High Resolution Spectroscopy". Nano Letters, vol. 16, No. 6, (2016), pp. 3732-3737.
Liu, Zhaowei, et. al., "Tuning The Focus Of A Plasmonic Lens By The Incident Angle". Applied Physics Letters, vol. 88, No. 17, (2006), pp. 171108-1-171108-2.

(56) References Cited

OTHER PUBLICATIONS

Chen, Yiguo, et. al., "Engineering The Phase Front Of Light With Phase-Change Material Based Planar Lenses". Scientific Reports vol. 5, No. 1, Mar. 2, 2015, pp. 1-7.
Kong, Soon-Cheol, et. al., "Photonic Nanojet-Enabled Optical Data Storage". Optical Society of America, Optics Express, vol. 16, No. 18, Sep. 1, 2008, pp. 13713-13719.
Pacheco-Peña, V., et. al., "Terajets Produced By Dielectric Cuboids". Applied Physics Letters 105, 084102, (2014), doi: 10.1063/1.4894243, 5 pages.
Pacheco-Peña, V., et. al., "Multifrequency Focusing And Wide Angular Scanning Of Terajets". Optical Society of America, Optics Letters, vol. 40, No. 2, (2015), 5 pages.
Itagi, A. V., et. al., , "Optics of Photonic Nanojets". Optical Society of America. J. Opt. Soc. Am. A , Vo.22, Dec. 2005 pp. 2847-2858 (12 pages).
Heifetz, Alexander, et. al., "Subdiffraction Optical Resolution Of A Gold Nanosphere Located Within The Nanojet Of A Mie-Resonant Dielectric Microsphere". Optical Express, vol. 15, No. 25, (2007), 17334-17342.
Devilez, Alexis, et. al., "Three-Dimensional Subwavelength Confinement Of Light With Dielectric Microspheres". Optics Express, vol. 17, No. 4, Feb. 16, 2009, pp. 2089-2094.
Shen, Yuecheng, et. al., "Ultralong Photonic Nanojet Formed By A Two-Layer Dielectric Microsphere". Optical Letters, Optical Society of America, vol. 39, No. 14, Jul. 15, 2014, 4120-4123.
Ruiz, César Méndez, et. al., "Detection Of Embedded Ultrasubwavelength-Thin Dielectric Features Using Elongated Photonic Nanojets". Optical Express, vol. 18, No. 16, Aug. 2, 2010, pp. 16805-16812.
Geints, Yuri E., et. al., "Photonic Nanojet Calculations In Layered Radially Inhomogeneous Micrometer-Sized Spherical Particles". Optical Society of America, vol. 28, No. 8, Aug. 2011, 1825-1830.
Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.
Mao, Xiurun, et. al., "Tunable Photonic Nanojet Formed By Generalized Luneburg Lens". Optics Express, vol. 23, No. 20, (2015), pp. 26426-26433.
Geints, Yu, E., et. al., "Modeling Spatially Localized Photonic Nanojets From Phase Diffraction Gratings". Journal of Applied Physics, vol. 119, No. 15, Apr. 21, 2016, pp. 153101-1-153101-6.
International Search Report and Written Opinion of the International Searching Authority for PCT/EP2019/055679 dated May 16, 2019, 10 pages.
International Preliminary Report on Patentability for PCT/EP19/055679 dated Sep. 15, 2020, 6 pages.
Kotlyar, Victor, et. al., "Photonic Nanojets Generated Using Square-Profile Microsteps". Optical Society of America, Applied Optics, vol. 53, No. 24, Aug. 20, 2014, pp. 5322-5329.
International Search Report and Written Opinion of the International Searching Authority for PCT/EP2019/055905 dated May 22, 2019, 12 pages.
International Preliminary Report on Patentability for PCT/EP2019/055905 dated Sep. 15, 2020, 8 pages.
Xiao, Jiasheng, et. al., "Design Of Achromatic Surface Microstructure For Near-Eye Display With Diffractive Waveguide". Optics Communications, vol. 452, (2019), pp. 411-416.
International Search Report and Written Opinion of the International Searching Authority for PCT/EP2019/063802 dated Sep. 16, 2019, 14 pages.
Ang, Angeleene S., et al., "'Photonic Hook' Based Optomechanical Nanoparticle Manipulator". Scientific Reports, vol. 8. No. 2029, Published online: Feb. 1, 2018, pp. 1-7.
Chaumet, P. C., et. al., "Time-Averaged Total Force On A Dipolar Sphere In An Electromagnetic Field". Optics Letters, vol. 25, No. 15, (2000), pp. 1065-1067 (3 pages).
Xu, Chen, et. al., "Photon Nanojet Lens: Design, Fabrication and Characterization". Nanotechnology, vol. 27, No. 16, Mar. 4, 2016, pp. 1-6.

Yue, Liyang, et. al., "Photonic Hook: A New Curved Light Beam". Optics Letters, vol. 43, No. 4, Feb. 2018, pp. 771-774 (5 pages).
International Search Report and Written Opinion of the International Searching Authority PCT/EP2019/084526 dated Mar. 10, 2020, 15 pages.
Boriskin, Artem, et. al., "Near Field Focusing By Edge Diffraction". Optics Letters, vol. 43, No. 16, Aug. 2018, pp. 4053-4056 (4 pages).
Shramkova, Oksana, et. al., "Localized Photonic Jets Generated By Step-Like Dielectric Microstructures". IEEE 20th International Conference on Transparent Optical Networks (ICTON), (2018), pp. 1-4. (4 pages).
Liu, Cheng-Yang, et. al., "Localized Photonic Nanojets Formed By Core-Shell Diffraction Gratings". Integrated Optics: Physics and Simulations III, International Society for Optics and Photonics, vol. 10242, (2017), p. 102420W (4 pages).
International Search Report and Written Opinion of the International Searching Authority for PCT/EP2019/063739 dated Aug. 8, 2019, (11 pages).
International Preliminary Report on Patentability for PCT/EP2019/063739 dated Jan. 5, 2021, (7 pages).
International Search Report and Written Opinion of the International Searching Authority for PCT/EP2019/086776 dated Mar. 6, 2020, 13 pages.
International Search Report and Written Opinion for PCT/EP2021/057273 dated Jun. 30, 2021 (15 pages).
International Preliminary Report on Patentability for PCT/EP2019/085489 dated Jun. 16, 2021, (8 pages).
International Preliminary Report on Patentability for PCT/EP2019/086776 dated Jun. 16, 2021, (9 pages).
Teranishi, N. et al.,"Evolution of optical structure in image sensors." In 2012 International Electron Devices Meeting, pp. 24-1. IEEE, 2012 (4 pages).
Nishiwaki, S. et al., "Highly Sensitive Image Sensors Using Micro Color Splitters." ITE Technical Report vol. 37 No. 47, Dec. 2014 (2 pages).
Chen, Q. et al., "Nanophotonic image sensors." Small 12, No. 36, 2016: 4922-4935 (14 pages).
Gennarelli, G.et al., "A uniform asymptotic solution for the diffraction by a right-angled dielectric wedge" IEEE transactions on antennas and propagation, vol. 59 No. 3, Mar. 2011 pp. 898-903 (6 pages).
Wang, P. et al., "Ultra-high-sensitivity color imaging via a transparent diffractive-filter array and computational optics: supplementary material." Optica, Oct. 2015 (9 pages).
Fontaine, R. "The state-of-the-art of mainstream CMOS image sensors." In Proceedings of the International Image Sensors Workshop, 2015 (4 pages).
Wang, P. et al., "Computational single-shot hyper-spectral imaging based on a microstructured diffractive optic." In 2016 Conference on Lasers and Electro-Optics (CLEO), IEEE, 2016 (2 pages).
Palanchoke, U. et al., "Spectral sorting of visible light using dielectric gratings." Optics Express 25, No. 26, Dec. 2017 pp. 33389-33399 (11 pages).
Rakovich, Y. P. et al., "Photonic Nanojets in Coupled Microcavities." In The European Conference on Lasers and Electro-Optics, p. JSV2_3. Optical Society of America, 2009 (1 page).
Yang, J. et al., "Polychromatic see-through near-eye display design with two waveguides and a large field-of-view." In Optics, Photonics and Digital Technologies for Imaging Applications IV, vol. 9896, p. 989605. International Society for Optics and Photonics, 2016 (7 pages).
International Preliminary Report on Patentability for PCT/EP2019/084526 dated Jun. 16, 2021, 11 pages.
Liu , Cheng-Yang, "Photonic Jets Produced by Dielectric Micro Cuboids". Applied Optics, vol. 54, Issue 29, (2015), pp. 8694-8699.
Varghese, B. et al., "Influence of an edge height on the diffracted EM field distribution." In 2019 21st International Conference on Transparent Optical Networks (ICTON), pp. 1-4. IEEE, 2019.
Shramkova, O. et al "Photonic nanojet generated by dielectric multi-material microstructure" META Jul. 2019, (2 pages).

* cited by examiner (a)

(b)

(a)

(b)

DIFFRACTION GRATING COMPRISING DOUBLE-MATERIALS STRUCTURES

The present application is a national stage application under 35 U.S.C. 371 of International Application No. PCT/EP2019/055679, entitled "DIFFRACTION GRATING COMPRISING DOUBLE-MATERIALS STRUCTURES", filed on Mar. 7, 2019, which claims benefit from European Patent Application Serial No. 18305263.8, entitled "DIFFRACTION GRATING COMPRISING DOUBLE-MATERIALS STRUCTURES."

1. TECHNICAL FIELD

The present disclosure relates to the field of optics and photonics, and more specifically to planar optical devices.

More particularly, but not exclusively, the present disclosure relates to diffraction gratings, containing near-field focusing and beam forming in the near-field zone elements, that can be used in a wide range of devices (as for example displays, including in and out coupling of light in waveguides for eyewear electronic devices and head-mounted displays for AR (Augmented Reality) and VR (Virtual Reality) glasses, optical sensors for photo/video/lightfield cameras, bio/chemical sensors, including lab-on-chip sensors, microscopy, spectroscopy and metrology systems, solar panels, etc.).

By near-field zone, it is meant here, and throughout this document, a region around a device according to the present disclosure, whose dimensions can extend from a fraction of the wavelength to about 10 wavelengths in the host medium. It may not obviously be limited to the non-radiative (reactive) zone but can also comprise the Fresnel radiative, the transition, and partly the far-field zones, depending on the size of the device.

2. BACKGROUND ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

With the advent of nanotechnology, the ever-increasing interest to explore the optical world at nanoscale has presented the demand to manipulate visible light in the sub-wavelength scale. Researchers have made significant efforts to decrease the size of optical lenses to micron and submicron scale for this very purpose; however, due to diffraction limit, their efforts are hindered when the size of a lens approaches the wavelength of the light.

The planar lens, thanks to its small thickness and excellent focusing capability, has been developed to replace its dielectric counterpart as a paradigmatic nanophotonic component. Several types of planar lenses have been studied so far, for example zone plates, nano-slit and nano-hole arrays, photonics crystals and metasurfaces. Although different terminologies are used in the aforementioned techniques, they share the same principle of focusing, which is to generate a constructive interference at the focal point by curving the phase front of an incident plane wave. Actually, the focusing (i.e. beam forming) of electromagnetic waves is an established way to increase locally the magnitude of the electric field and, in such a way, to enhance efficiency of sensors, e.g. electro-optical sensors whose operational principles rely on the conversion of the energy propagating in space in the form of an electromagnetic wave into an output voltage or current.

The performance of planar lenses has been optimized through sophisticated designs. However, most of the proposals so far lack the possibility to control the focal spot position or to change the orientation of an electromagnetic beam.

There are a number of optical devices, which comprise components enabling light focusing and deviating functions. Among those are digital image sensors used in various photo/video cameras, optical combiners used in AR/VR glasses, and light guiding systems being the essential part of various light capturing and light processing devices. There are also some components, which are able to perform both functions simultaneously, such as asymmetric dielectric lenses and diffractive lenses and diffractive gratings.

Transformation Optics (TO) allows the possibility to control electromagnetic (EM) fields in unprecedented and unbelievable ways through the use of judiciously engineered materials with parameters that vary spatially. Such flexibility in controlling EM waves appears to be convenient in the design of novel devices with performance or special desired properties difficult to achieve and has therefore inspired considerable research interests in the field of wave propagation.

A lens providing the possibility to change the direction of propagation of an electromagnetic radiated beam was proposed by J. Yi et al. in « Coherent beam control with an all-dielectric transformation optics based lens », Scientific Reports, Vol. 6, Article number: 18819 (2016).

The excitation source transmits through the lens corresponding to the transformed medium, which deflects the beam away from the normal direction. The all-dielectric compact low-cost lens prototype presenting a graded permittivity profile was fabricated through three-dimensional (3D) polyjet printing technology. The array of radiators was composed of four planar microstrip antennas realized using standard lithography techniques and was used as excitation source for the lens.

One possible method that enables the manipulation of visible light in the subwavelength scale uses surface plasmons; these surface plasmon-based lenses, or so-called plasmonic lenses, can achieve subwavelength-scale focal zones. However, to fully realize the potential of plasmonic lenses, it is necessary to not only focus light, but also to manipulate and precisely position it at small scales. In "Beam bending via plasmonic lenses", Opt. Expr., Vol. 18, No. 22 23458 (2010), Ya. Zhao et al aimed to provide a more practical, easy-to-implement method to achieve directional modulation with a plasmonic lens. Design principle for plasmonic lenses that can bend light along the direction transverse to the propagation direction was proposed. Light bending is achieved by constructing a carefully designed, curved phase front for the plasmonic lenses. The control of the phase front profile is achieved through two mechanisms: phase retardation caused by the width and shape of the individual slits in the lens, and the position of these slits. The proposed single-layered lenses can be conveniently fabricated using Focused Ion Beam (FIB) techniques and are thus much more feasible than their existing counterparts.

Near-field optical trapping of objects using plasmonic antenna structures has recently attracted great attention. However, metal nanostructures also provide a compact platform for general wavefront engineering of intermediate and far-field beams. In "*Optical Manipulation with Plasmonic Beam Shaping Antenna Structures*" (*Advances in Optoelectronics*, vol. 2012, Article ID 595646), Yo. C. Jun et al. analyze optical forces generated by plasmonic beam shaping antenna structures and show that they can be used for general optical manipulation such as guiding of a dielectric particle along a linear or curved trajectory. An asymmetric slitgroove structure generates a collimated beam at an angle. The different groove periods on either side generate constructive interference in the off-axis direction. Authors have also demonstrated that different wavelengths result in different interference conditions and beaming directions.

Metasurfaces can provide unique solutions to realize complex optical systems in a compact and planar configuration. The off-axis meta-lenses that simultaneously focus and disperse light of different wavelengths with unprecedented spectral resolution were presented in "*Super-Dispersive Off-Axis Meta-Lenses for Compact High Resolution Spetrcoscopy*" (*Nano Lett.*, Vol. 16, No. 6, 3732 (2016)) by M. Khorasaninejad et al. They are designed based on the geometric phase via rotated silicon nanofins and can focus light at angles as large as 80°.

Various strategies have emerged to enable the tunability of planar lens, in which one wants to manipulate the transmitted phase front from a predefined structure. For instance, varying the angle of the incident light was demonstrated to tune the focal position of a plasmonic lens by Liu Z. et al. in "*Tuning the focus of a plasmonic lens by the incident angle*" (*Appl. Phys. Lett.*, Vol. 88, 171108 (2006)). The inclusion of active tunability in static plasmonic devices greatly enhances their functionality. Index-variable materials are often incorporated in plasmonic devices and optical metasurfaces, including liquid crystals, vanadium dioxide, silicon and other materials. Thus, one may manipulate the optical phase of the guided modes excited in graded-index metalenses in order to achieve a certain degree of tunability in the focusing behavior of the photonic device. A novel planar metalens, which consists of an array of slits that are filled with phase-change material $Ge_2$ $SB_2$ $Te_5$ (GST), has also been proposed to engineer the far-field focusing patterns in "*Engineering the phase front of light with phase-change material based planar lenses*" by Y. Chen et al (Sci. Rep., Vol. 5, Article number: 8660 (2015)).

However, we should note that the functionality of plasmonic lenses in optical wavelength range suffers from high absorption losses. There are also some fabrication difficulties reducing the effectiveness of the proposed topologies. The possible solution of this problem enabling the required functionality of controlling both the position and deviation of an electromagnetic beam can be found using the dielectric materials.

There is also a number of near-field focusing components enabling the sub-wavelength resolution (that is of interest for many today and future nano-photonic applications) but not fully capable of producing the required light deviation function. A photonic nanojet (NJ) is a narrow high-intensity optical radiation flux formed in the proximity to the shadow surface of illuminated transparent dielectric symmetric bodies with a diameter comparable or somewhat larger than the wavelength of the incident optical radiation. The physical origin of photonic NJ formation arises from the interference (both constructive and destructive) of the radiation net fluxes diffracted and passed through a particle (see for example "*Photonic nanojet-enabled optical data storage*" by S.-C. Kong et al. (*Opt. Express*, Vol. 16, No. 18, 2008)", patent document U.S. Pat. No. 7,394,535, "*Terajets produced by dielectric cuboids*" by V. Pacheco-Pena et al. (*Applied Phys. Lett.*, Vol. 105, 084102, 2014) and "*Multifrequency focusing and wide angular scanning of terajets*" by V. Pacheco-Pena et al. (*Opt. Lett.* Vol. 40, No. 2, pp. 245-248, 2015)).

A most striking and specific feature of photonic NJ is the extremely high spatial localization of the light field in the longitudinal direction (relative to the direction of incidence), which, in contrast to the conventional high-NA (Numerical Aperture) focusing optics, can lead to the subwavelength dimensions of the photonic jet. The common interest to the NJ effect is mostly caused by the promises of its practical application in nanophotonics, biology, medicine, and nano-electronics. The principles of functioning of some devices are based on the fact that the NJ can provide the high intensity of the electromagnetic field in a localized spatial region near a microparticle and has high sensitivity to the perturbations of both the field and material origin.

The problems of controlled NJ characteristics' manipulation, the creation of thinner or longer and intensive jets by variation of microlens optical properties attract a growing interest. The latest studies have shown that both the NJ shape and intensity depend significantly on the size and optical properties of a generating microparticle (see for example "*Optics of photonic nanojets*" by A.V. Itagi et al. (*J. Opt. Soc. Am. A*, Vol. 22, 2847 (2005)), "*Subdiffraction optical resolution of a gold nanosphere located within the nanojet of a Mie-resonant dielectric microsphere*" by A. Heifetz et al. (*Opt. Express*, Vol. 15, 17334 (2007), and "*Three-dimensional subwavelentgh confinement of light with dielectric microspheres*" by A. Devilez et al. (*Opt. Express*, Vol. 17, 2089 (209)).

Moreover, if the NJ is produced by a composite radially inhomogeneous particle consisting of several concentric shells with different refractive indices (see for example "*Ultralong photonic nanojet formed by a two-layer dielectric microsphere*" by Yu Shen et al. (*Opt. Lett.*, Vol. 39, No. 14, 4120 (2014), "*Detection of embedded ultrasubwavelength-thin dielectric features using elongated photonic nanojets*" by C. M. Riuz et al. (*Opt. Express*, Vol. 18, No. 16, 16805 (2010), "*Photonic nanojet calculations in layered radially inhomogeneous micrometer-sized spherical particles*" by Yu E. Geints et al. (*J. Opt. Soc. Am.* 8, Vol. 28, No. 8, 1825 (2011) and "*Super-long photonic nanojet generated from liquid-filled hollow microcylinder*" by G. Gu et al. (*Opt. Lett.*, Vol. 40, No. 4, 625 (2015)) or graded refractive index material ("*Tunable photonic nanojet formed by generalized Luneburg lens*" by X. Mao et al. (*Opt. Expre*. Vol. 23, No. 20, 026426 (2015)), then the NJ characteristics can be changed significantly, in particular, it becomes possible to elongate the photonic jet abnormally and also to amplify further the electrical field.

Hence, the overview of the available concepts for the design of deviating components reveals the lack of a reliable solution capable of providing the light deviation functions.

It would hence be desirable to provide a new type of optical device, which would enable to achieve the deviation functions of an electromagnetic beam in the near-field zone.

It would also be desirable to provide such a new optical device, which would fully satisfy the needs of emerging nano-photonic applications in terms of performance characteristics and fabrication difficulties. In other words, it would also be desirable to provide such a new optical device, which would show a simple topology compatible with established micro- and nano-fabrication techniques.

A diffraction grating optimized to achieve maximum grating efficiency in a diffraction order other than the zero order can provide light deviation functions in the far-field zone. To design new diffraction gratings, we propose to use double-material microlenses deviating and focusing the incident light in the near-field zone for the purpose of a targeted light distribution in the far-field zone.

3. SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Hence, the present disclosure provides a diffraction grating for diffracting light comprising a substrate and a plurality of grating unit cells positioned on said substrate surface. It is remarkable in that grating unit cells form a periodic array of grating unit cells which are parallel to each other on said substrate surface or are along a same axis, wherein a period of the grating is d that belongs to a range from 300 nm to 1000 nm, wherein said diffraction grating is associated with a three-dimensional Cartesian coordinates system defined by axis x, y and z, wherein the z-axis is normal to said diffraction grating, wherein a cross-section of a grating unit cell, in a vertical xz plane, comprises a homogeneous dielectric host medium with a first refractive index $n_1$, embedding at least a first block of a first dielectric material with a first width $W_1$ along an x-axis, a height H along a z-axis and a second refractive index $n_2$, an edge of which along said z-axis is in direct contact with at least a second block of a second dielectric material with a second width $W_2$ along said x-axis, said height H along said z-axis and a third refractive index $n_3$, said first, second and third refractive indexes $n_1$, $n_2$ $n_3$ are different from each other such that $n_1<n_3<n_2$, wherein said first block and said second block have a trapezoidal cross-section in said vertical xz plane, wherein said first and second blocks having two sidewalls and a top surface running parallel to a top surface of the substrate, said trapezoidal cross-section defining base angles, and wherein said plurality of grating unit cells provides non symmetrical response for positive first diffraction order and negative first diffraction order based on nanojets hot spot positions defined by values of said parameters H, $n_1$, $n_3$, $n_2$ and said base angles, from electromagnetic waves, which are normally incident on said diffraction grating and come from a side opposite to said substrate in a vertical xz plane with a free-space wavelength λ, called an operating wavelength, said free-space wavelength λ belonging to the visible light domain, and wherein said nanojets being generated at edges between dielectric materials with different refractive indexes.

In a variant, said cross-section comprises:
a first edge between said host medium and said first block along said z-axis that is targeted to form a first beam in a near field zone, being a first nanojet;
a second edge between said first block and said second block along said z-axis that is targeted to form a second beam in said near field zone, being a second nanojet;
a third edge between said second block and said host medium along said z-axis that is targeted to form a third beam in said near field zone, being a third nanojet, and wherein a shift of position along said x-axis and/or an angle of deviation from said z-axis in said vertical xz plane of a beam resulting from an at least partial combination of said first, second and third beams depend on said first, second and third refractive indexes $n_1$, $n_2$ $n_3$, said widths and heights of said first and second blocks in said cross-section and said base angles.

In a variant, said first beam is a tilted beam, and an angular position of a projection of said first beam in said vertical xz plane, called an elevation angle depends on a ratio between said first refractive index $n_1$ and said second refractive index $n_2$.

In a variant, said second beam is a tilted beam, and an angular position of a projection of said second beam in said vertical xz plane, called an elevation angle depends on a ratio between said second refractive index $n_2$ and said third refractive index $n_3$.

In a variant, said third beam is a tilted beam, and an angular position of a projection of said third beam in said vertical xz plane, called an elevation angle depends on a ratio between said first refractive index $n_1$ and said third refractive index $n_3$.

In a variant, said first width $W_1$ and said second width $W_2$ are equal, and said shift of position of said total beam along said x-axis depends on said first, second and third refractive indexes $n_1$, $n_2$ and $n_3$ and said widths and heights of said first and second blocks in said cross-section.

In a variant, a total width $W=W_1+W_2$ of said first and second blocks along said x-axis is smaller than or equal to said operating free-space wavelength $W\leq\lambda$.

In a variant, said first and second dielectric materials belong to the group comprising:
glass;
plastic;
a polymer material;
oxide;
nitride.

In a variant, said homogeneous dielectric host medium embeds a series of first and second blocks.

In a variant, said plurality of grating unit cells modify the non-symmetrical response for first diffraction order, with parameters $n_1$, $n_3$ and $n_2$ that belong to respectively ranges [1, 2.4], [1.3, 2.4] and [1.3, 2.4].

4. BRIEF DESCRIPTION OF THE DRAWINGS

Figure 2:
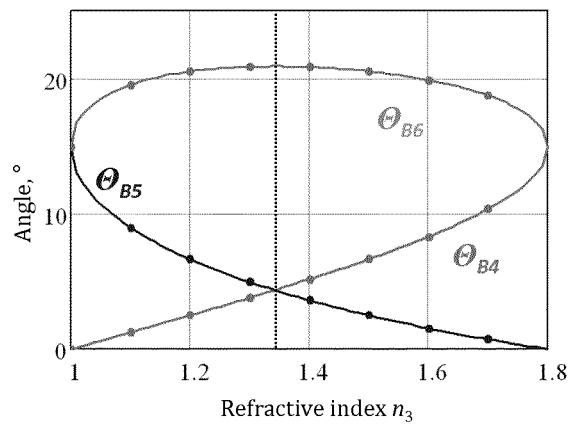
Figure 4:
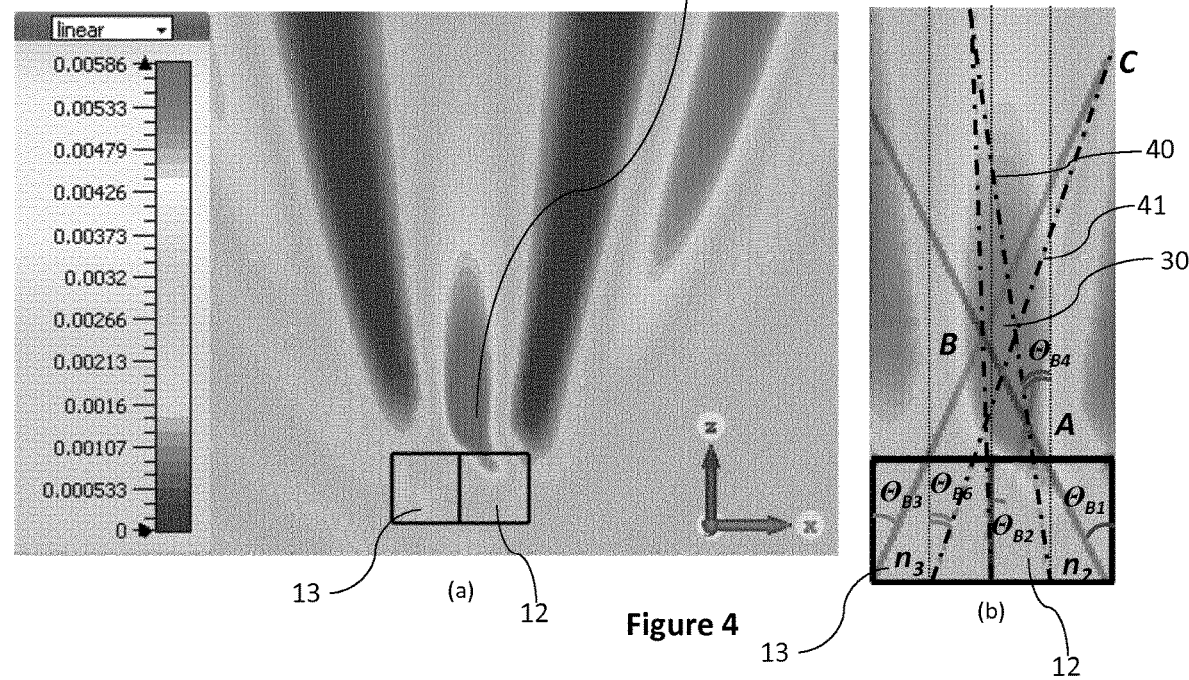
Figure 5:
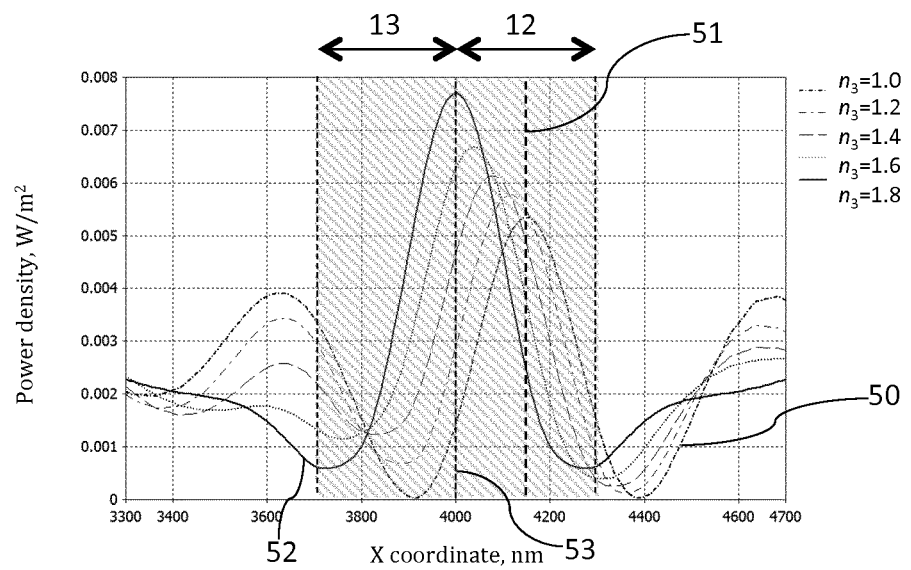
Figure 6:
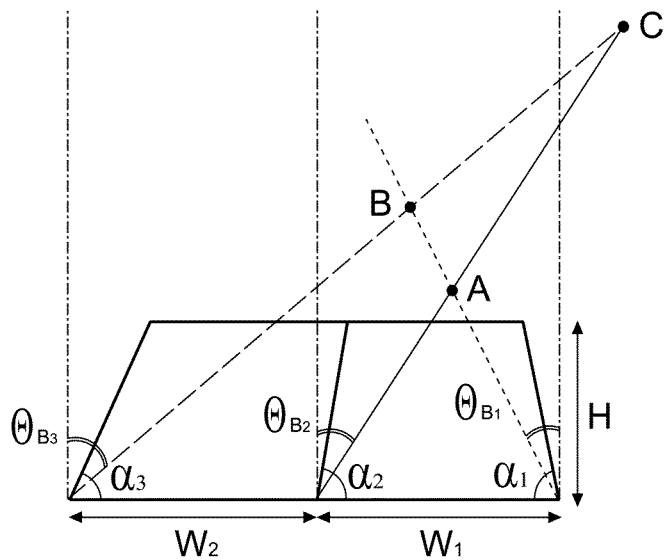
Figure 7:
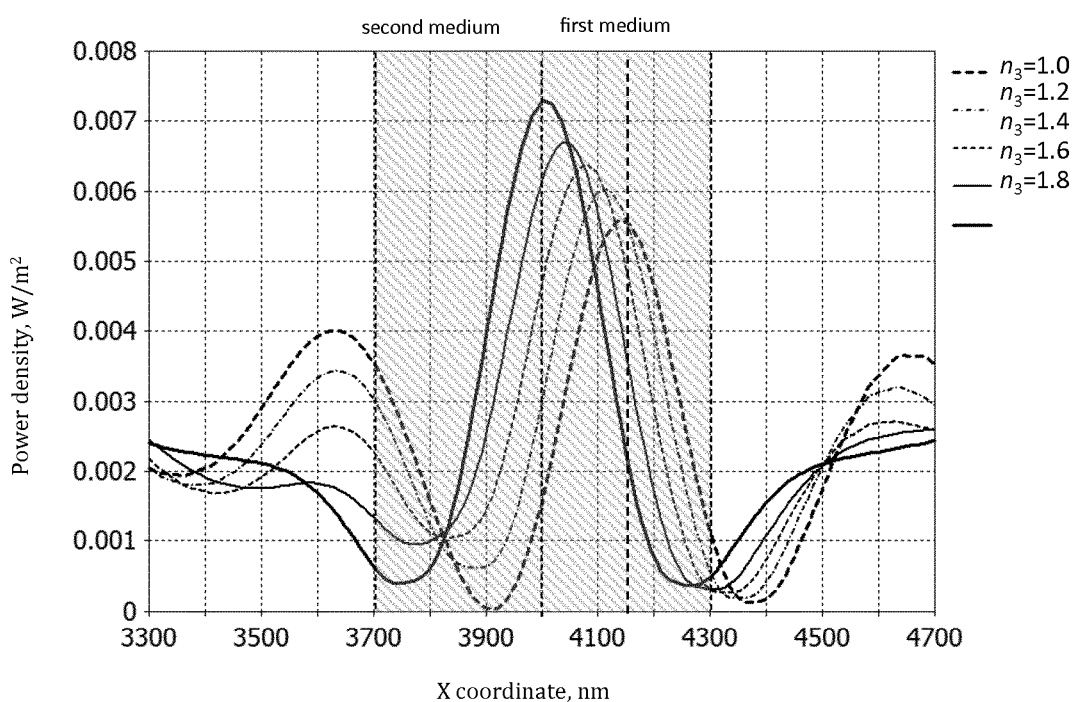
Figure 8:
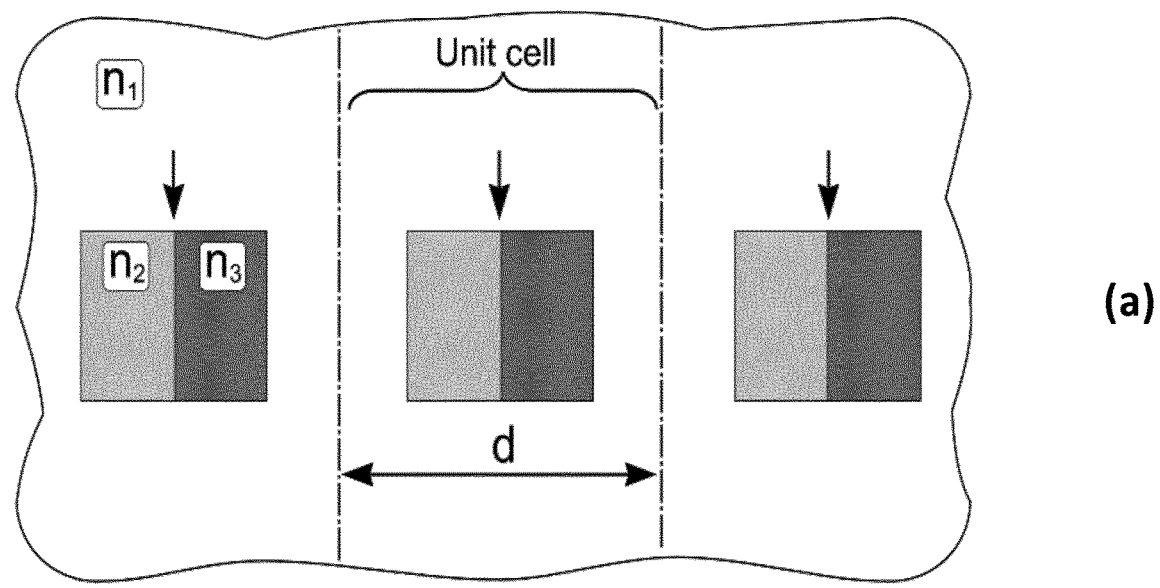
Figure 8:
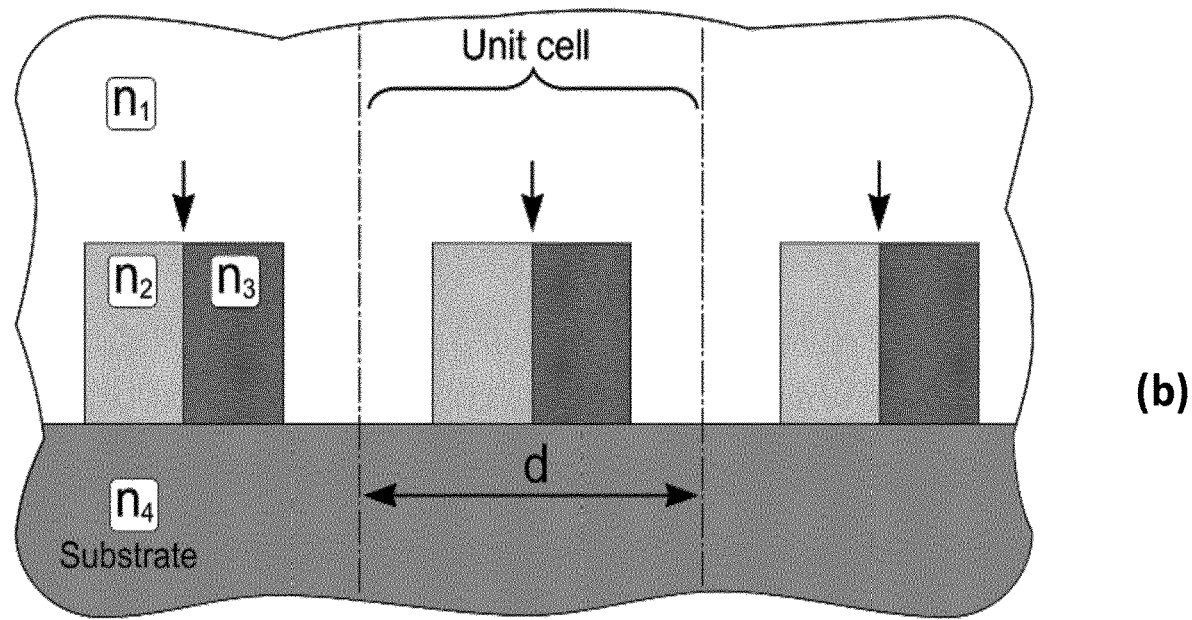
Figure 9:
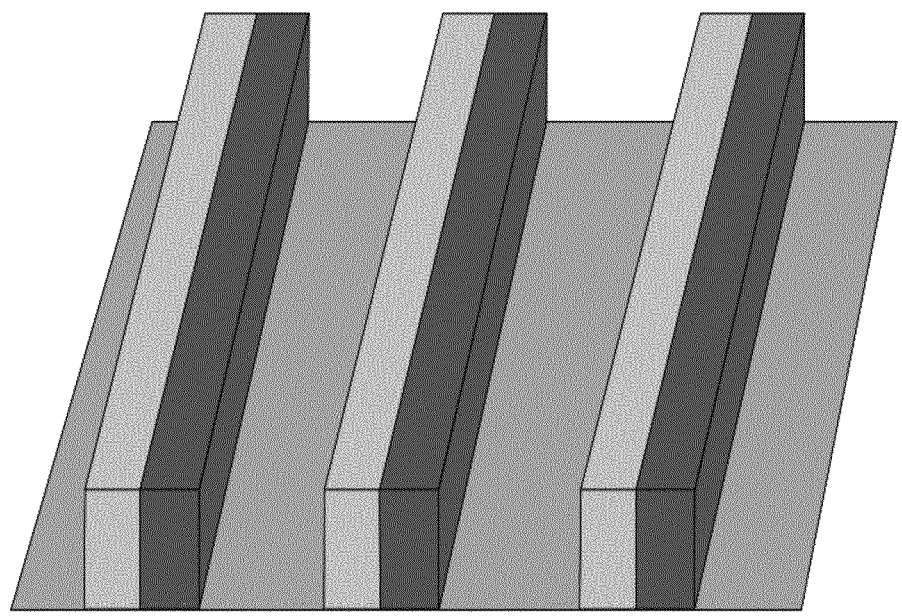
Figure 9:
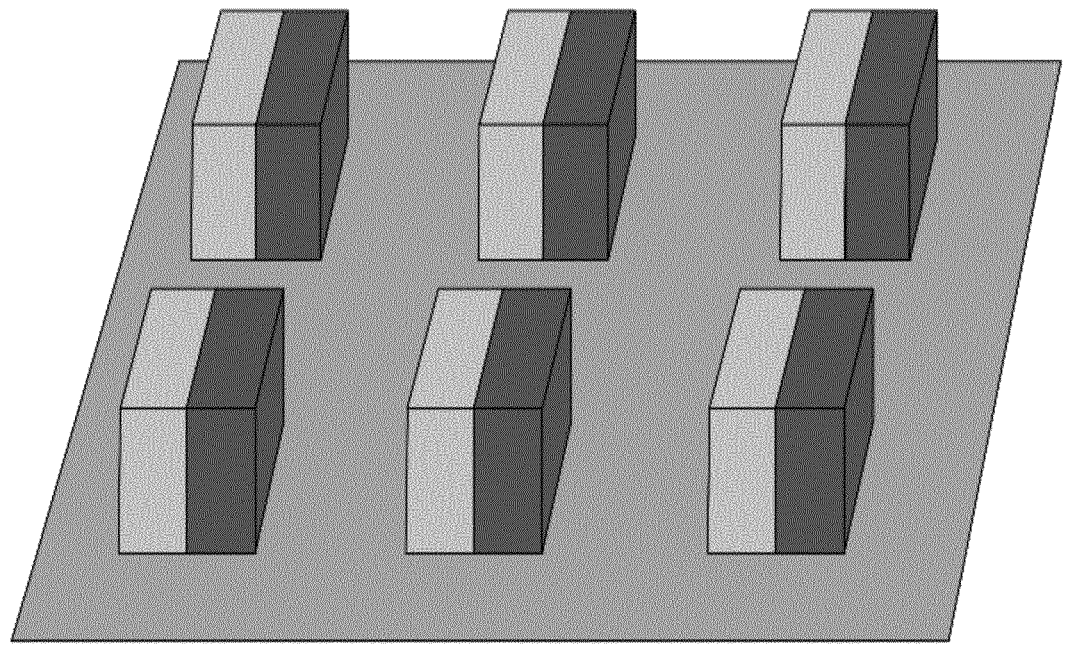
Figure 12A:
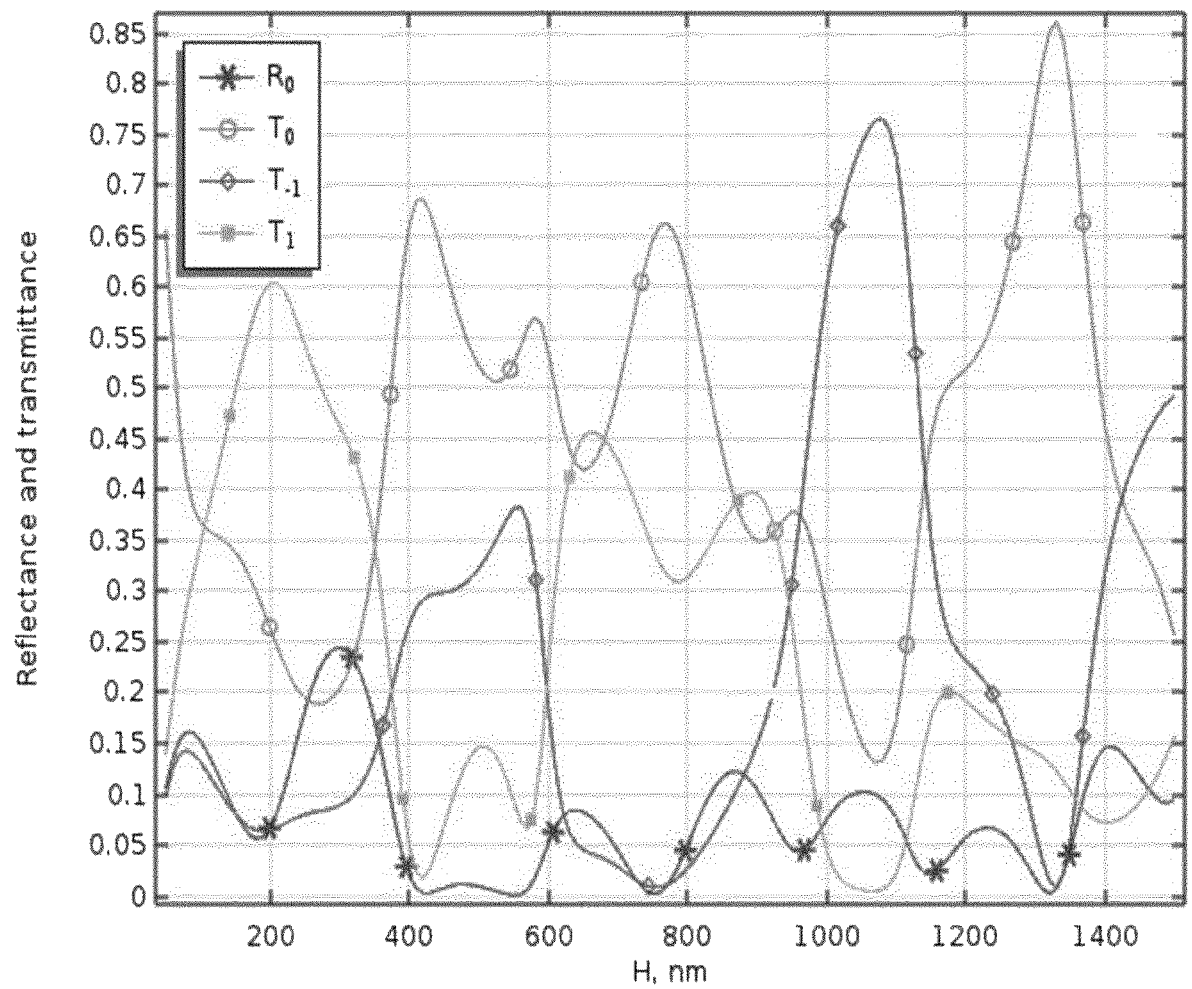
Figure 12B:
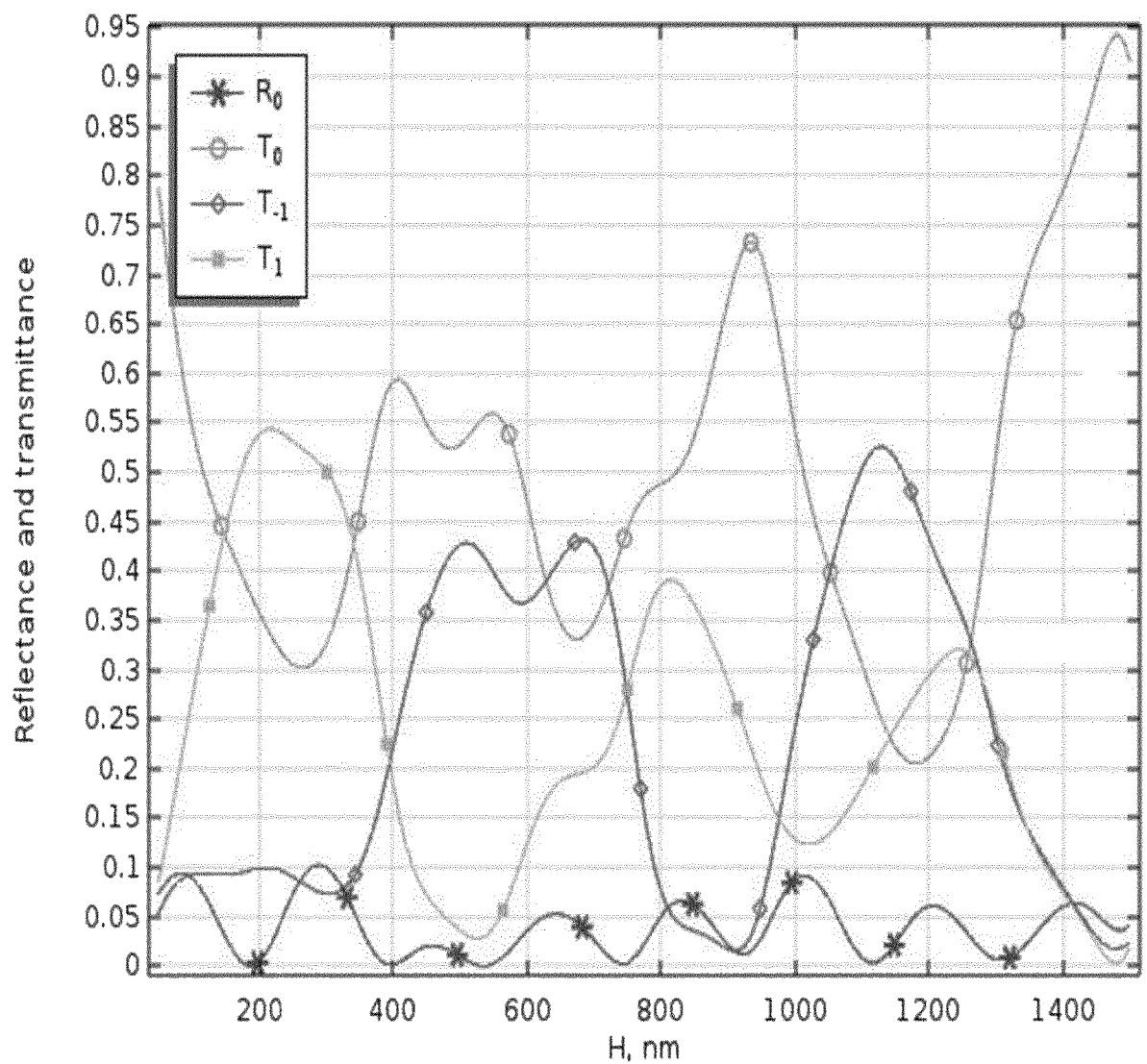
Figure 13A:
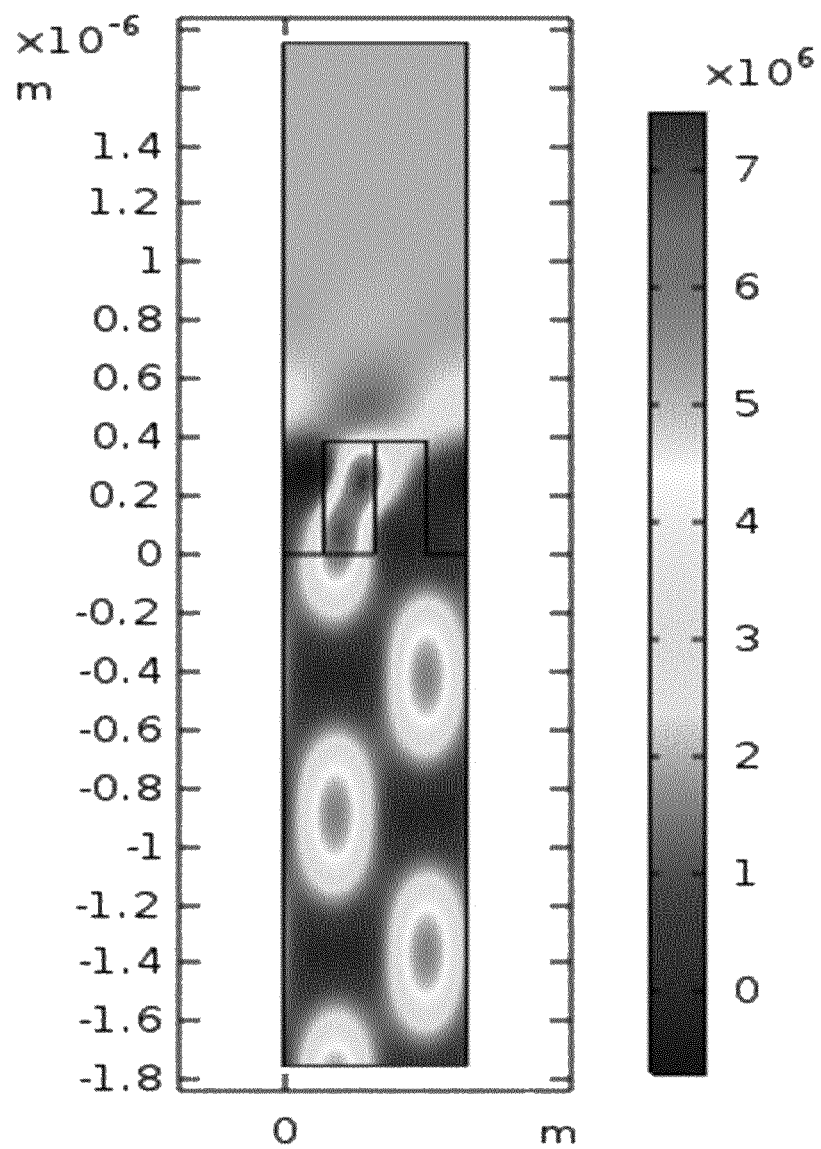
Figure 13B:
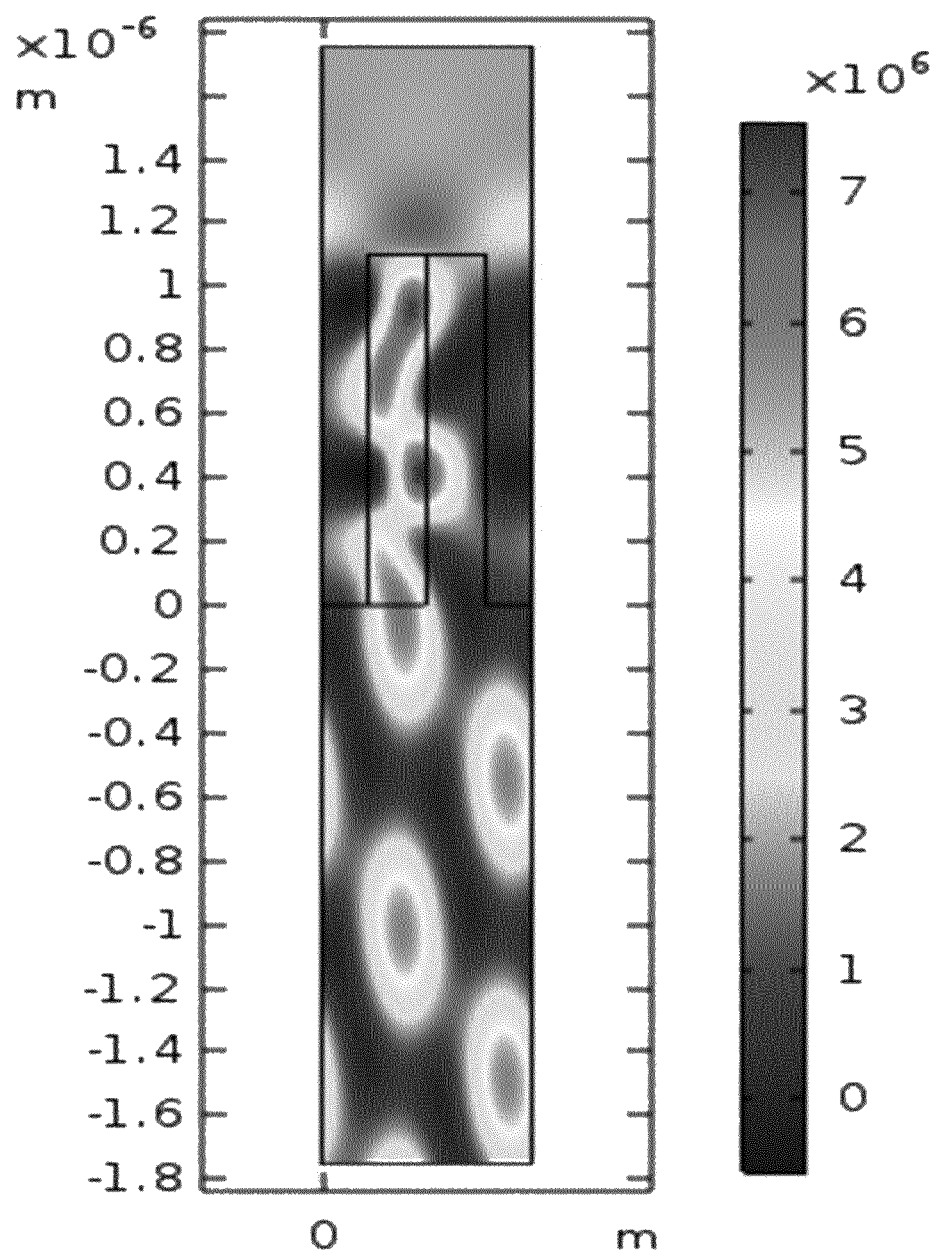
Figure 14:
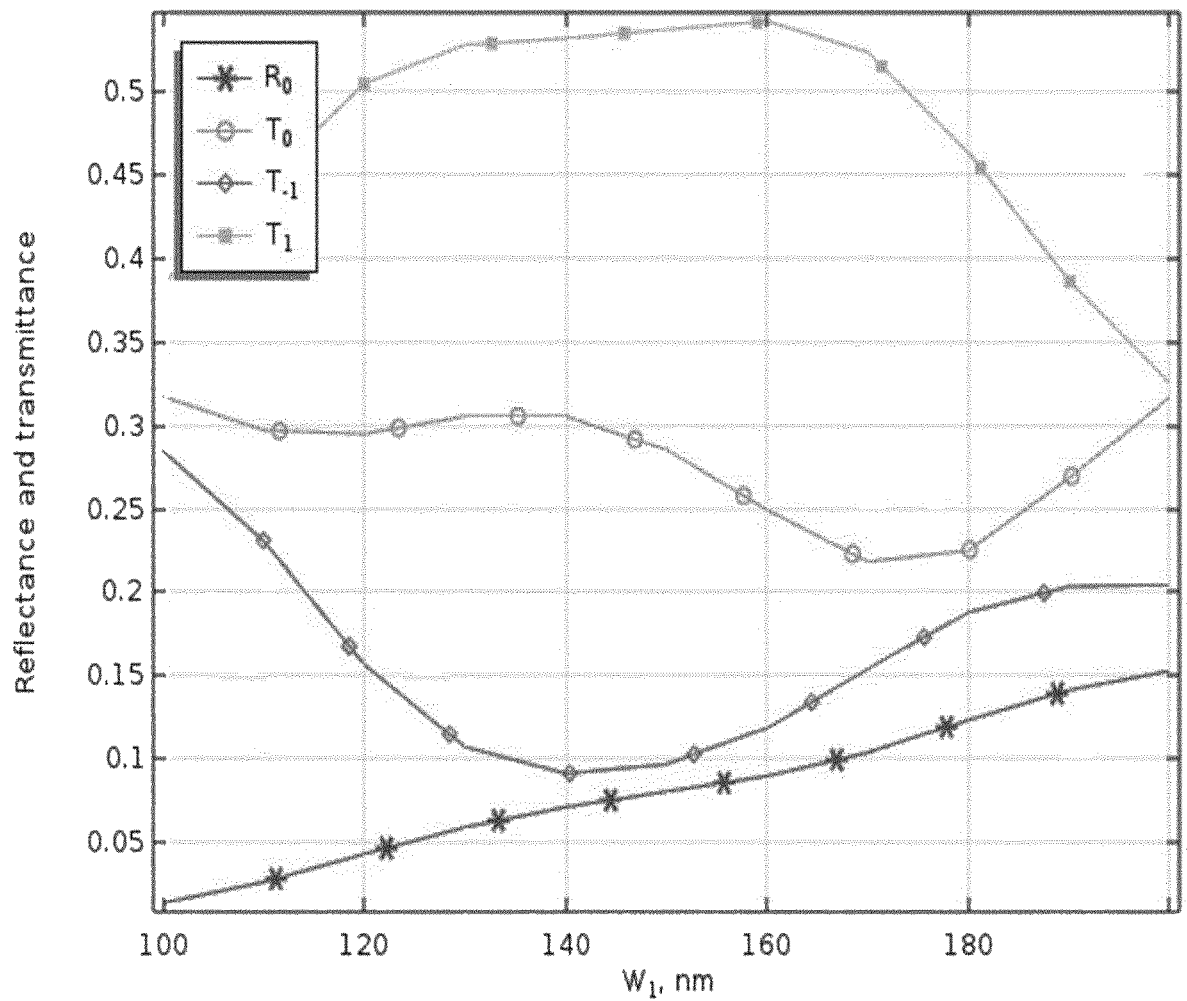

The present disclosure can be better understood with reference to the following description and drawings, given by way of example and not limiting the scope of protection, and in which:

FIG. 1 illustrates the cross-section view, in a XZ plane of a double-material structure representing the element of a diffraction grating unit cell according to an embodiment of the present disclosure;

FIG. 2 presents the dependencies of deviation angles of the focused beams on parameters of the double-material structure of FIG. 1;

FIGS. 3(a) and 3(b) respectively illustrate power density distribution in the xz-plane and the schematic distribution of the multiple NJ generated by a first exemplary structure of FIG. 1;

FIGS. 4(a) and 4(b) respectively illustrate power density distribution in the xz-plane and the schematic distribution of the multiple NJ generated by a second exemplary structure of FIG. 1;

FIG. 5 presents the power density distribution along X-coordinate for different values of refractive index $n_3$ for an exemplary structure of FIG. 1;

FIG. 6 provides a cross-section view of a double-material structure with nonvertical edges;

FIG. 7 illustrates the power density distribution along x-axis for an exemplary system of FIG. 6;

FIG. 8(a) and (b) present different cross section of grating lines or unit cells according to one embodiment of the disclosure;

FIG. 9(a) and (b) present different possible geometries of diffraction gratings according to one embodiment of the disclosure;

FIGS. 10 present relationships between reflectance and transmittance vs. refractive index of the block referenced 12 in FIG. 1, and with the incident wavelength $\lambda=620$ nm, d=500 nm, $W_1=W_2=140$ nm, H=250 nm); (a) $n_3=n_4=1.3$, (b) $n_3=n_4=1.5$, (c) $n_3=n_4=1.8$;

FIG. 11 (a,b) present time averaged power flow distribution in xz-plane for the system with such parameters: $\lambda=620$ nm, d=500 nm, $W_1=W_2=140$ nm, H=250 nm, $n_3=n_4=1.3$; (a) for single double-material microlens; (b) for the unit cell of diffraction grating with double-material elements; (c) X-coordinate of NJ hot spot versus $n_2$ for the single double-material element; (d) Z-coordinate of NJ hot spot versus $n_2$ for the single double-material element; (e) Z-component of time averaged power flow versus $n_2$ for the single double-material element;

FIG. 12 presents the reflectance and transmittance vs. height of the double-material element at $\lambda=620$ nm for the diffraction grating with d=500 nm, $n_2=2.0$, $W_1=W_2=140$ nm and (a)—$n_3=n_4=1.3$, (b) $n_3=n_4=1.5$;

FIG. 13 presents a time averaged power flow distribution in xz-plane for the unit cell of diffraction grating with double-material elements with such parameters: $\lambda=620$ nm, d=500 nm, $W_1=W_2=140$ nm, $n_2=2.0$, $n_3=n_4=1.5$, (a)—H=390 nm, (b)—H=1100 nm;

FIG. 14 presents a reflectance and transmittance vs. width of the constitutive parts ($W_1=W_2$) of the double-material element at $\lambda=620$ nm for the diffraction grating with d=500 nm, $n_3=n_4=1.5$, $n_2=2.0$, H=250 nm.

The components in the figures are not necessarily to scale, emphasis instead being placed upon illustrating the principles of the invention.

5. DETAILED DESCRIPTION

The general principle of the present disclosure relies on the design of a diffraction grating containing structures or unit cells, which combines different dielectric materials to control the position of a focused nanojet beam, and change the direction of the NJ beam orientation. To enable this functionality, it is proposed to combine two or more dielectric materials with different refractive indexes in such a way that all the NJ beams, originating from different edges (associated with different blocks/layers) of the microstructure, recombine and contribute to the formation of a NJ beam deflected from the normal direction. According to the present disclosure, it is possible to achieve maximum efficiency in the desired diffraction order by changing the materials and dimensions of the constitutive parts of such a device.

In other words, such a general principle consists in designing a NJ beam forming element (also called hereafter a microlens), to be considered as the elements of the diffraction grating unit cell as a combination of at least two dielectric materials with different refractive indexes having a nonsymmetrical system in a vertical cross-section. Hereafter, microlenses having such a topology are referred to as microlenses based on a combination of different materials, or also double-material microlenses, in contrast to single-material NJ microlenses presented in patent document EP 3 223 063. This transformation results in a deviation of a focused NJ beam. Such a component, enabling control over the NJ beam direction, may be of interest for a number of applications requiring precise near-field patterning and/or deviation of an incident electromagnetic wave (e.g. visible light) propagation direction. A potential additional advantage of the proposed combined microlens is the possibility to change the position of the NJ hot spot. The diffraction grating containing such type of elements may find applications in glasses or solar panels for example.

The improved performance characteristics of the proposed NJ microlenses make them attractive for a variety of today and future mobile applications.

5.1 Topology

FIG. 1 illustrates the cross-section view, in a XZ plane of a double-material microlens or unit cell 10 which represents the constitutive part of the diffraction grating according to an embodiment of the present disclosure.

Such a double-material microlens or unit cell 10, in cross-section view, corresponds to a combination of two different blocks of materials, referenced 12 and 13. Their cross-section is rectangular (as illustrated in FIG. 1), but could also be trapezoidal or cuboid-shaped.

Blocks referenced 12 and 13 respectively have refractive indexes $n_2$ and $n_3$ ($n_2>n_3$) embedded in a homogeneous dielectric host medium 11 with a refractive index $n_1<n_3$. For simplicity, we assume that all the materials are lossless and non-dispersive. Blocks 12 and 13 could also be placed on a dielectric substrate (not illustrated) acting as a support layer.

Block 12 has a width $W_1$ and a height H, while block 13 has a width $W_2$ and the same height H.

Hereafter, we consider that blocks 12, 13 have vertical edges parallel to z-axis and top/bottom surfaces parallel to xy-plane, which corresponds to a base angle $\alpha=90°$. However, some prismatic structures (with arbitrary base angles) can also be used. Variation of the base angle value provides additional degree of freedom in the control of the NJ beam radiation, as discussed hereafter in relation to FIGS. 16 to 21.

The double-material microlens 10 is illuminated from below by an incident electromagnetic wave 14, with a free-space wavelength $\lambda$, which is the operating wavelength of the optical device 10. On FIG. 1, the electromagnetic wave is illustrated with a direction parallel to the z-axis. However, we consider more generally an incident electromagnetic wave 14 incident from below in the xz-plane. More generally, the double-material microlens 10 is illuminated from below by incident electromagnetic waves 14: actually, a monochromatic (single wavelength) wave may be considered as a superposition of two waves with different polarizations, i.e. both a TE and a TM polarizations. The wave 14 is defined according to its propagation direction and polarization.

On the peculiar example of FIG. 1, the lens is illuminated by a linearly-polarized plane wave E={0,1,0}.

According to the present disclosure, the materials and size of the constitutive parts 11, 12 and 13 can be optimized in order to manage the position of a NJ hot spot, intensity, direction and angle of deviation of a NJ beam.

Actually, the inventors of the present disclosure have found out that diffraction of a plane wave on a microlens 10 based on the combination of different dielectric materials, can result in the deviation of the NJ away from the normal direction. The position of focal spot, angle of deviation, intensity and shape of NJ beam can be controlled by the variation of the refractive indexes $n_1$, $n_2$, $n_3$ and sizes ($W_1$, $W_2$, H) of the constitutive parts/blocks 12, 13. Hence, the NJ beam can be shifted from the axis of symmetry of the system by tuning the parameters of the blocks 12, 13.

The effect of the form, size and refractive indexes of the constitutive blocks on the parameters of the generated NJ is investigated in the following sections.

5.2 Design Principles & Main Performance Characteristics of the Elements of Diffraction Grating In this Section, we present a set of equations to estimate the optimal combinations of materials and dimensions of the blocks 12, 13 for NJ beam shift and deviation. The hot spot position and direction of beam deviation are sensitive to the sizes ($W_1$, $W_2$, H) of constitutive parts. For microlenses 10 with dimensions larger than a few wavelengths the Fresnel diffraction phenomenon will have a huge impact.

5.2.1 Main Characteristics of Generated NJ Beams

As demonstrated in patent document EP 3 223 063 in the name of the same Applicant, the beam-forming phenomenon appears on an edge between two materials of different refractive indexes, and is associated solely with this edge. The ratio of refractive indexes between both materials contributes to controlling an elevation angle of the generated nanojet beam, which is an angular position of a projection of the NJ beam in the vertical xz plane. Actually, the NJ beam radiation angle is defined by the Snell's law and can be determined using the approximate formula:

$$\Theta_{B1} \approx \frac{90° - \Theta_{TIR1}}{2}, \quad (1)$$

where $$\Theta_{TIR1} = \sin^{-1}\left(\frac{n_1}{n_2}\right)$$

is the critical angle of refraction, $n_1$ is the refractive index of the host medium 11, and $n_2$ is the refractive index of the microlens material. The point of intersection of two equal NJ beams radiated from the opposite sides of the element determines the focal length of the NJ microlens. In a first approximation, in the case of a single material element the focal length of the NJ lens can be characterized as the function of the size (width) and index ratio of the media inside and outside the lens. The total radiated NJ beam will be directed along the symmetry axis of the system.

The focal length of such a microlens can be estimated as:

$$F = \frac{W_1 \gamma}{2}, \quad (2)$$

where $$\gamma = \frac{1}{\tan\Theta_{B1}},$$

$W_1$ is the width of a single element.

As illustrated in FIG. 1, when a second element 13 with refractive index $n_3$ and width $W_2$, is attached in direct contact with the first element 12 with refractive index $n_2$, the angle of NJ beam radiation from the boundary between both elements 12, 13 will not remain equal to $\Theta_{B1}$. The new NJ beam will be refracted at the angle $\Theta_{B2}$ into the medium with higher refractive index. If $n_2 > n_3$ we will determine angle $\Theta_{B2}$ as:

$$\Theta_{B2} \approx \frac{90° - \Theta_{TIR2}}{2}, \quad (3)$$

where $$\Theta_{TIR2} = \sin^{-1}\left(\frac{n_3}{n_2}\right).$$

The NJ beam radiation angle at the third edge, between block 13 and host medium 11, corresponds to:

$$\Theta_{B3} \approx \frac{90° - \Theta_{TIR3}}{2}. \quad (4)$$

Here $$\Theta_{TIR3} = \sin^{-1}\left(\frac{n_1}{n_3}\right).$$

Let us note that the length and intensity of these three NJs, generated by the three edges between the materials 11, 12 and 13 with different refractive indexes, will be different. The maximal intensity and minimal length correspond to the beam with highest ratio between the refractive indexes. In the exemplary case illustrated in figure 1, it will be the NJ refracted at the angle $\Theta_{B1}$ generated at the boundary between block 12 and host medium 11.

The three nanojet beams generated at the boundaries between the materials of different refractive indexes of optical device 10 may partially or totally combine, to produce a total focused beam, which corresponds to the interference pattern caused by the three primary nanojet beams associated with the three edges of device 10.

To explain the behavior of total NJs radiated by the double-material microlens 10, we should determine the points of intersection (denoted A, B and C on FIG. 1) of these initial, or primary, NJs associated with the edges of the system 10 and radiated at the angles $\Theta_{B1}$, $\Theta_{B2}$ and $\Theta_{B3}$.

The point A of first (NJ1) and second (NJ2) NJs' intersection has the coordinates ($W_A$, $H_A$), where:

$$W_A \approx \tan\Theta_{B2} \cdot H_A, \quad (5)$$

$$H_A \approx \frac{W_1}{\tan\Theta_{B1} + \tan\Theta_{B2}}.$$

Angle $\Theta_{B4}$ indicates the angle of deviation of the focal point A from the axis of symmetry parallel to the z-axis for the first block 12 with width $W_1$:

$$\tan\Theta_{B4} \approx \frac{\tan\Theta_{B1} - \tan\Theta_{B2}}{2}. \quad (6)$$

First (NJ1) and third (NJ3) NJs will intersect at a point B with the coordinates ($W_B, H_B$), where:

$$W_B \approx \tan\Theta_{B3} \cdot H_B - W_2, \quad (7)$$

$$H_B \approx \frac{W_1 + W_2}{\tan\Theta_{B1} + \tan\Theta_{B3}}.$$

Angle $\Theta_{B5}$ shows the angle of deviation of the focal point B from the axis of symmetry parallel to the z-axis for the whole microlens 10 with total width $W_1+W_2$:

$$\tan\Theta_{B5} \approx \frac{W_2 \tan\Theta_{B1} - W_1 \tan\Theta_{B3}}{W_1 + W_2} \quad (8)$$

It is necessary to note, that second (NJ2) and third (NJ3) nanojets will intersect only if $n_3 \sqrt{n_1 n_2}$. In this case, the coordinates of the point C will be determined as:

$$W_C \approx \tan\Theta_{B3} \cdot H_C - W_2, \quad (9)$$

$$H_C \approx \frac{W_2}{\tan\Theta_{B3} - \tan\Theta_{B2}},$$

and the angle $\Theta_{B6}$ of a focal point deviation for the block 13 of width $W_2$ will be determined as:

$$\tan\Theta_{B6} \approx \frac{\tan\Theta_{B2} + \tan\Theta_{B3}}{2} \quad (10)$$

The particular case of all NJs' intersection at the same point for fixed refractive indexes of constitutive parts 12, 13 and host medium 11 can be obtained as the result of variation of the geometrical sizes of constitutive parts. It was obtained that to get an intersection of all NJs' at one point the ratio $W_1/W_2$ should be equal to:

$$\frac{W_1}{W_2} \approx \frac{\tan\Theta_{B1} + \tan\Theta_{B2}}{\tan\Theta_{B3} - \tan\Theta_{B2}}. \quad (11)$$

In this case, all three beams NJ1, NJ2 and NJ3 make an input into the total generated beam by microlens 10. The intensity of the total generated beam will hence be maximal.

The dependencies of deviation angles $\Theta_{B4-B6}$ on refractive index $n_3$ for fixed value $n_2=1.8$ and $W_1=W_2$ are presented in FIG. 2. For the chosen parameters, the critical value of refractive index $n_3$ is $n_{3cr}=\sqrt{n_1 n_2}=1.34$. Second and third nanojets NJ2 and NJ3 will only intersect in a case when $n_3 > n_{3cr}$.

5.2.2 Parametric Study

To illustrate the features of the total generated NJ beam, which corresponds to the interference pattern caused by the three primary nanojet beams associated with the three edges of the device 10, a parametric study was conducted using CST (Computer Simulation Technology) software for a 2D double-material microlens 10. We assume that the system 10 is illuminated by linearly polarized waves 14.

The structure 10 was first simulated with equal dimensions of constitutive parts 12, 13 ($W_1=W_2$). FIG. 3(a) illustrates power density distribution in the xz-plane at $\lambda=550$ nm for a microlens 10 with the following parameters: $n_2=1.8$, $n_3=1.3$, $W_1=W_2=300$ nm, H=300 nm (H<$H_A$). Host medium 11 of the microlens 10 is air with $n_1=1$. On FIG. 3(a), several nanojet beams or hot spots may be observed. Actually, the interaction of the three primary nanojets NJ1, NJ2 and NJ3 creates three beams 30, 31, 32 in the example of FIG. 3(a). Beams 31 and 32 are secondary beams, which are observe outside the blocks 12, 13. Beam 30 is the result of interference of the three primary nanojet beams NJ1, NJ2 and NJ3 and is thus considered as the main generated focused beam, which takes birth inside the microlens 10 but is also observed outside the blocks 12, 13.

When considering beam 30 in FIG. 3(a), a NJ beam shift to the left can be observed, as the position of the generated NJ beam 30 is shifted along x-axis.

Hence, by shift of the position of the total generated focused beam, it is meant here, and throughout this document, a shift along x-axis.

FIG. 3(b) presents the schematic distribution of the multiple NJ generated by microlens 10. We can conclude that for $n_3 < \sqrt{n_1 n_2}$ the position of the hot spot (corresponding to the peak of field intensity within the nanojet beam) of the total generated NJ beam 30 will be close to the point A (point of first and second NJs' intersection NJ1 and NJ2). Varying the refractive index $n_3$ of the second block 13 of the system 10, we can tune the position of the hot spot of the total generated beam 30. When increasing refractive index $n_3$, we increase the shift of generated NJ 30 (decrease $W_A$) and $H_A$. The resulting beam 30 will almost not be sensitive to the influence of NJ3. This fact can be explained by the relatively small intensity of NJ3.

FIG. 4(a) illustrates power density distribution in the xz-plane at $\lambda=550$ nm for a microlens 10 with the following parameters: $n_2=1.8$, $n_3=1.6$, $W_1=W_2=300$ nm, H=300 nm. Host medium 11 of the microlens 10 is air with $n_1=1$.

Figure 3:
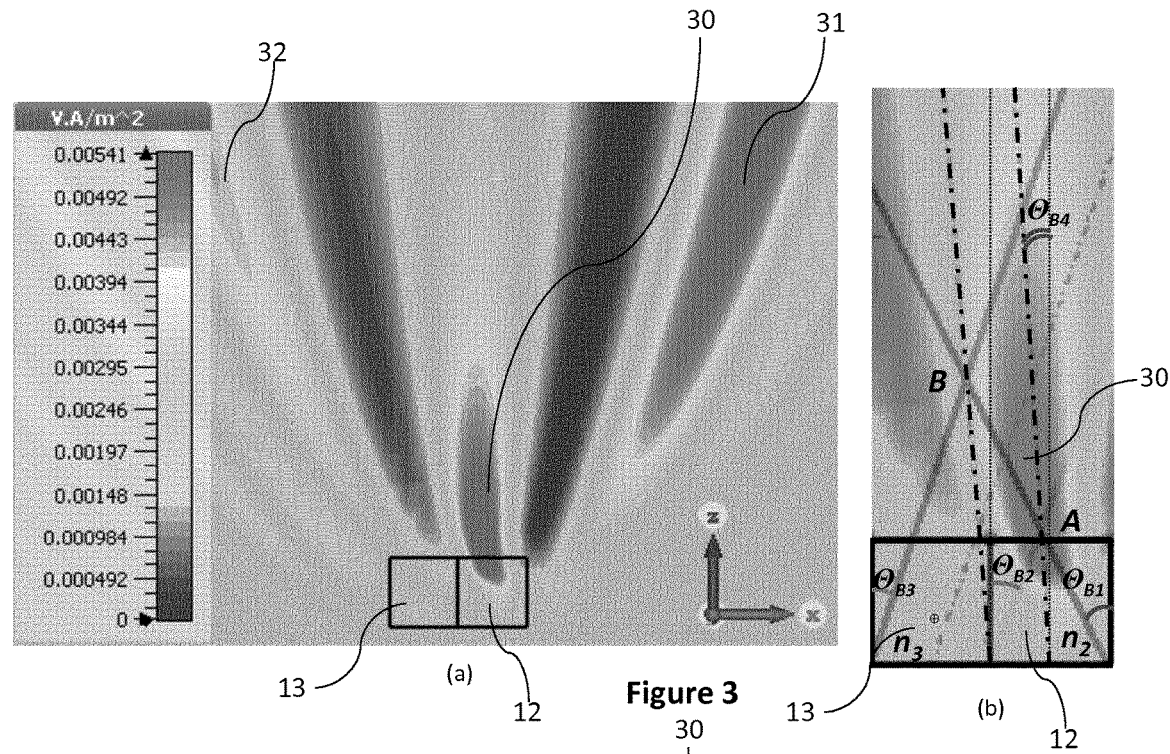

FIG. 4(a) and (b) shows that for $n_3=1.6$ ($n_3 > \sqrt{n_1 n_2}$), the position of the hot spot of NJ beam 30 will be changed, as compared to FIG. 3. However, it is still close to the dash-dot line 40 determining the deviation of the focal point A from the vertical axis of symmetry of the first block 12 (angle of deviation is equal to $\Theta_{B4}$). In this case we should take into account the influence of NJ3. Now the intensity of this nanojet NJ3 will be closer to the intensity of the first one (NJ1). In fact, the position of the hot spot of the total generated focused beam 30 will be slightly shifted; now it will be between dash-dot curve 40 and dash-dot curve 41, which determines the displacement of the focal point C from the vertical axis of symmetry of the second block 13 (the angle deviation is equal to $\Theta_{B6}$).

The power density distribution along X-coordinate for different values of refractive index $n_3$ at $Z_0=450$ nm ($Z_0$ is the distance from the bottom of the system 10) is presented in FIG. 5. Dotted line 50 corresponds to the case of a single block microlens 10 ($n_3=1.0$, so that the second block 13 is merged with the host medium 11) with a total generated focused beam oriented along the z-axis of symmetry 51 of the system 10; solid line 52 shows the dependence for a combination of two blocks 13, 12 with the same refractive indexes ($n_2=n_3=1.8$), the total generated NJ is oriented along the z-axis of symmetry 53 of the double-layer (double-block) system 10.

As mentioned before, the sizes of constitutive elements 12, 13 have strong impact on the behavior of the total generated NJ beam 30. The influence of the height H of constitutive blocks 12, 13 on the parameters of generated Nis was analyzed. It was obtained that for the system 10 with total width $W=W_1+W_2 \leq \lambda (W_1=W_2)$ the position of the NJ hot spot is not sensitive to the height H of the system 10 for all values of refractive indexes $n_2$, $n_3$ of dielectric materials. The sensitivity rises with increase of the width W.

5.2.3 Design Principles & Main Performance Characteristics for the Double-Material Microlenses With Nonvertical Edges In this subsection, we consider the structures with non-vertical edges and top/bottom surface parallel to xy-plane. Let us assume that $a_{1,2,3}$ are the base angles for a double-material system. The general topology of the double-material NJ lenses is illustrated in FIG. 6. This cross-section view may correspond to the double-material prismatic system embedded in a homogeneous dielectric host media with a refractive index $n_1 < n_2 < n_3$.

As it was demonstrated by the inventors, for the systems with the base angles $\alpha_j > 90 - \Theta_{Bj}$ (here j=1,2,3 is the number of the edge) the NJ beam radiation angle can be determined using the approximate formula (12):

$$\Theta_{Bj} \approx \frac{90° - \Theta'_{TIRj}}{2}. \quad (12)$$

Here $\Theta'_{TIRj}$ are the critical angles of refraction from the nonvertical edges. To get the approximate formula for $\Theta'_{TIRj}$ we should just take into account the changing of the position of the edge. As the result, the NJ beam radiation angle can be estimated as:

$$\Theta_{Bj} \approx 90° - \frac{\Theta_{TIRj} + \alpha_j}{2}. \quad (13)$$

To explain the behavior of total NJs radiated by the double-material microlens 10 we should substitute these expressions for NJ radiation angles into the formulas (4)-(11).

To illustrate the influence of modified microlens topology on the parameters of the NJ, we simulate the structure with $W_1=W_2$. FIG. 7 illustrates power density distribution along X-coordinate for different values of refractive index $n_3$ at $Z_0=430$ nm at $\lambda=550$ nm for the double-material system with $n_3 < \sqrt{n_1 n_2}$ and $H < H_4$. We can see that as in the case of the system with normal base angles, the position of the hot spot of total generated beam 30 depends on the refractive index of the second block 13 of the system 10.

In the case of the system with nonvertical edges the main performance characteristics of the double-material system discussed before are preserved.

5.2.4 Conclusions

As a conclusion to this parametric study, it therefore appears that the optical device 10 according to the present disclosure, which is based on a non-symmetrical structure relying on a combination of different dielectric materials, provides a unique set of optical functions, including focusing and shifting. Moreover, it shows a simple topology, compatible with established planar micro/nano fabrication methods, e.g. nanoimprinting and photolithography.

The operation of such an optical device 10 relies on the fact that three NJ beams, originating from different edges (associated with different blocks/layers) of the microstructure, recombine and contribute to the formation of a total NJ beam deflected from the normal direction.

Such an microlens allows generating a NJ beam shift, with respect to the central vertical axis of symmetry of the cross-section of device 10 in the xz-plane. The position of the total generated focused beam is determined by the sizes and refractive indexes of the constitutive parts of device 10: for the systems with equal sizes of constitutive parts ($W_1=W_2$) and $W \leq \lambda$ the NJ beam shift towards the part 13 with lower refractive index $n_3$ is observed. Varying the refractive index $n_3$ allows tuning the position of hot spot (increasing $n_3$ we decrease the distance between the axis of the symmetry of the miclolens and position of the hot spot). The NJ hot spot position is not sensitive to the height H of the system for all values of refractive indexes of dielectric materials. The total response of the system is almost independent on the wavelength $\lambda$ of incident electromagnetic wave 14.

5.3 Main Characteristics of Diffraction Gratings Containing Double-Material Elements Such a property to deviate light by one double material element/structure can advantageously be used in diffraction gratings. FIG. 8(a) shows the diffraction grating with double-material elements embedded into a dielectric material with refractive index $n_1$. The grating constant or the period of the grating is d. A linearly-polarized plane wave is normally incident on the grating from the top in a plane perpendicular to the grating. Angles of the diffracted beams are not influenced by the structure of the double-material elements. They are determined by the period of the grating, wavelength of the incident plane wave and angle of wave incidence. Hence, they can be calculated according to the grating equation.

The performance of the grating depends on the polarization of the incident wave and parameters (dimensions, form and material) of the elements. Unlike the diffraction grating containing symmetrical single-material elements (regular structure of the same spacing), the proposed diffraction grating based on the double-material elements achieves nonsymmetrical distribution of an intensity ($Tj \neq T-j$, $Rj \neq R-j$, . . . , where j is the number of diffraction order) leading to the maximal grating efficiency for the desired diffraction order. In the case of elements with $W \leq \lambda$ the maximal input corresponds to the orders ±1.

In the embodiment of FIG. 8(b), the diffraction grating comprises the layer forming a substrate for the double-material elements. The refractive index of the substrate is $n_4$. The possible realization of the gratings in 3D space is presented in FIGS. 9(a) and 9(b).

Figure 10A:
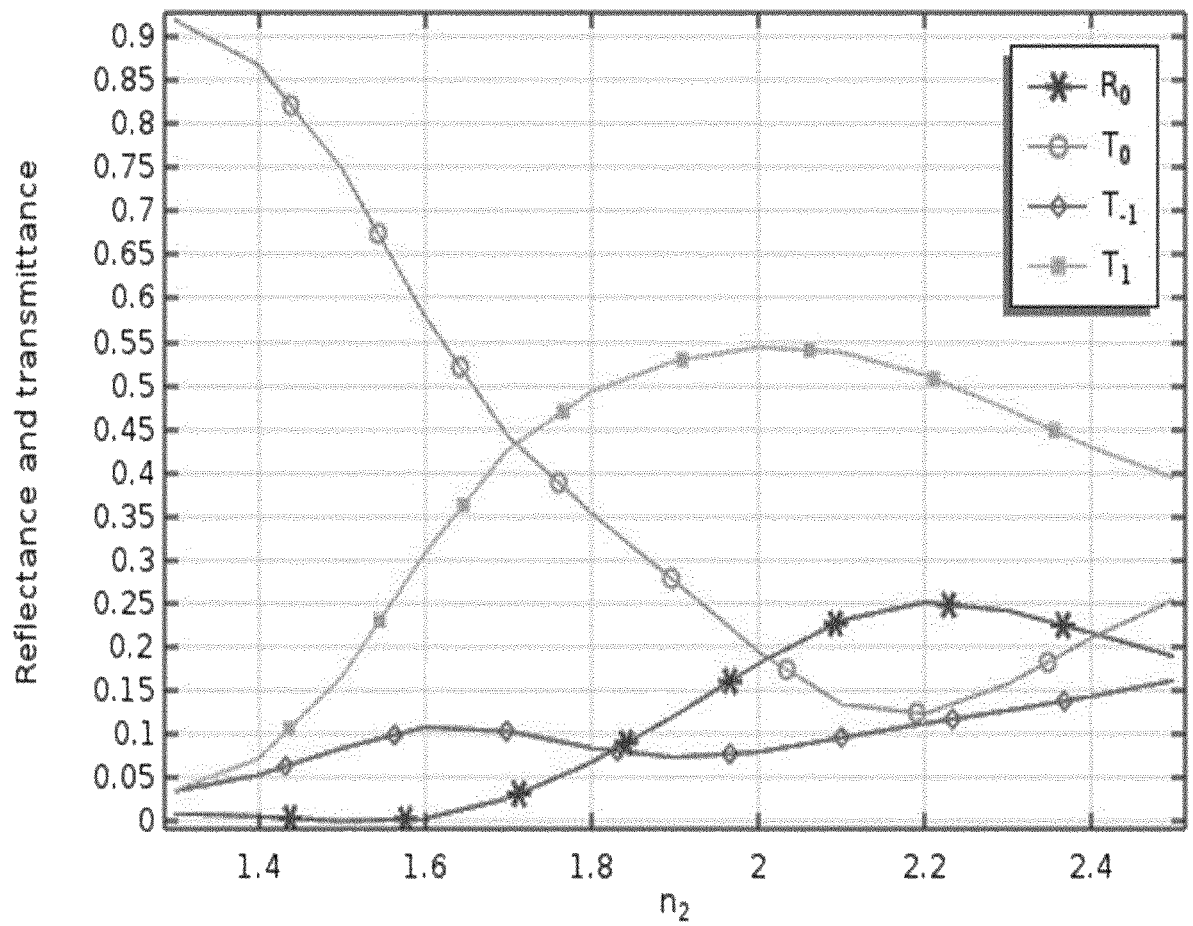
Figure 10B:
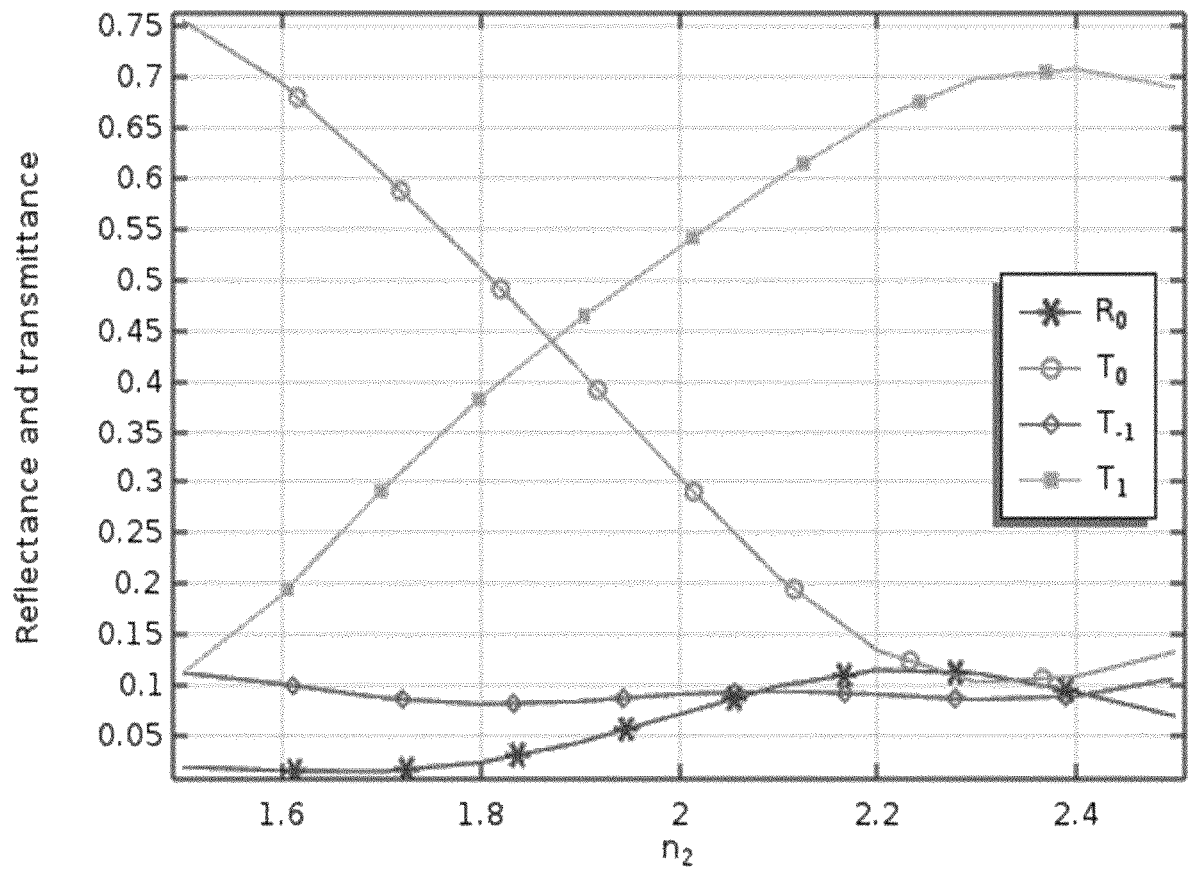
Figure 10C:
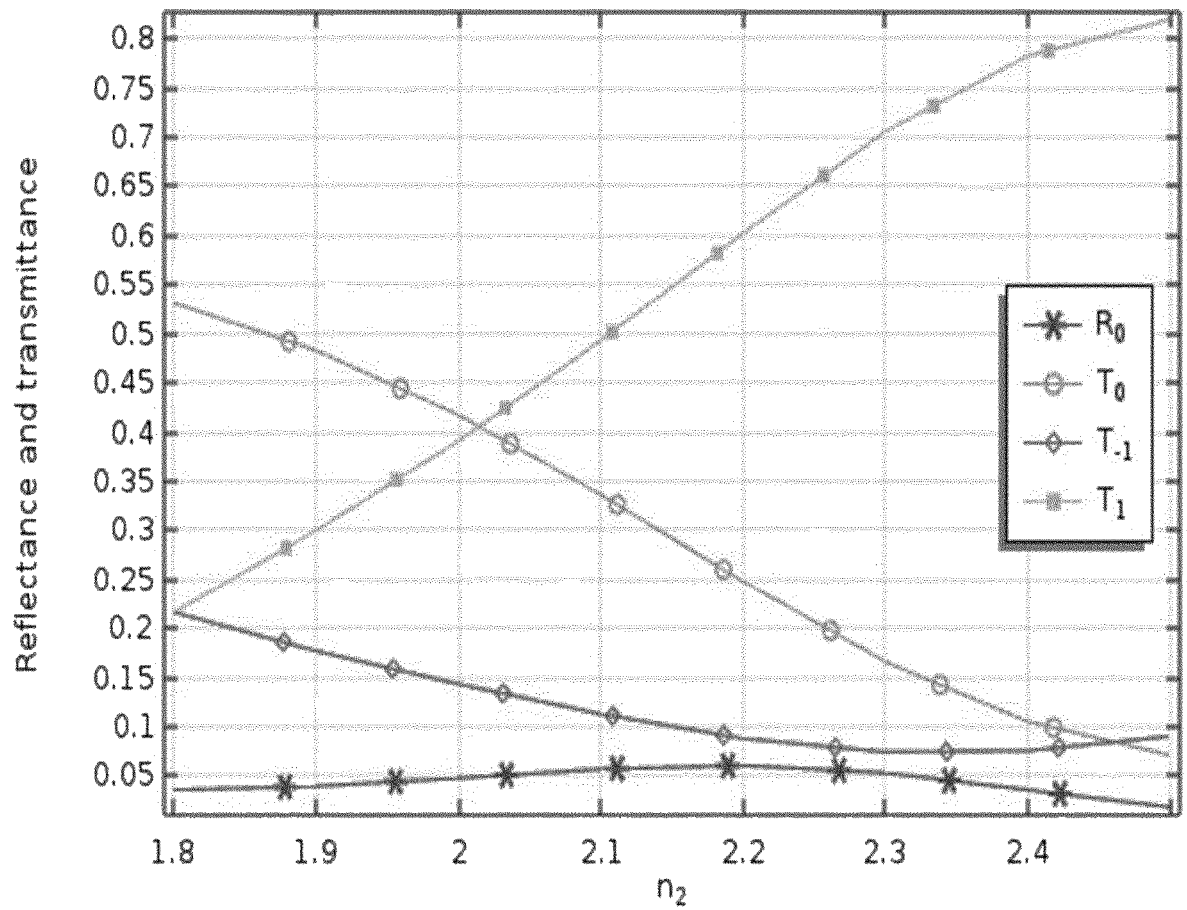

The computed reflectance and transmittance for TE incidence are plotted in FIG. 10(a)-(c). It illustrates reflectance for 0-order and transmittance for 0 and ±1 orders at $\lambda=620$ nm for a grating with the substrate (FIG. 8(b)) and with the period d=500 nm and double-material elements with the following parameters: $n_3=n_4$, $W_1=W_2=140$ nm, H=250 nm. The full-wave electromagnetic analysis was done for the 2D array of double-material elements (FIG. 9(a)). We assumed that the system is infinite in X-direction. It can be seen, that changing the refractive index $n_2$ we can modify the performance of the grating and dramatically increase the refracted transmittance for the 1st order. The effect of intensity redistribution will be observed for dielectric materials with $1.3 < n_3 < 2.4$ and $n_3 < n_2$.

Figure 11A:
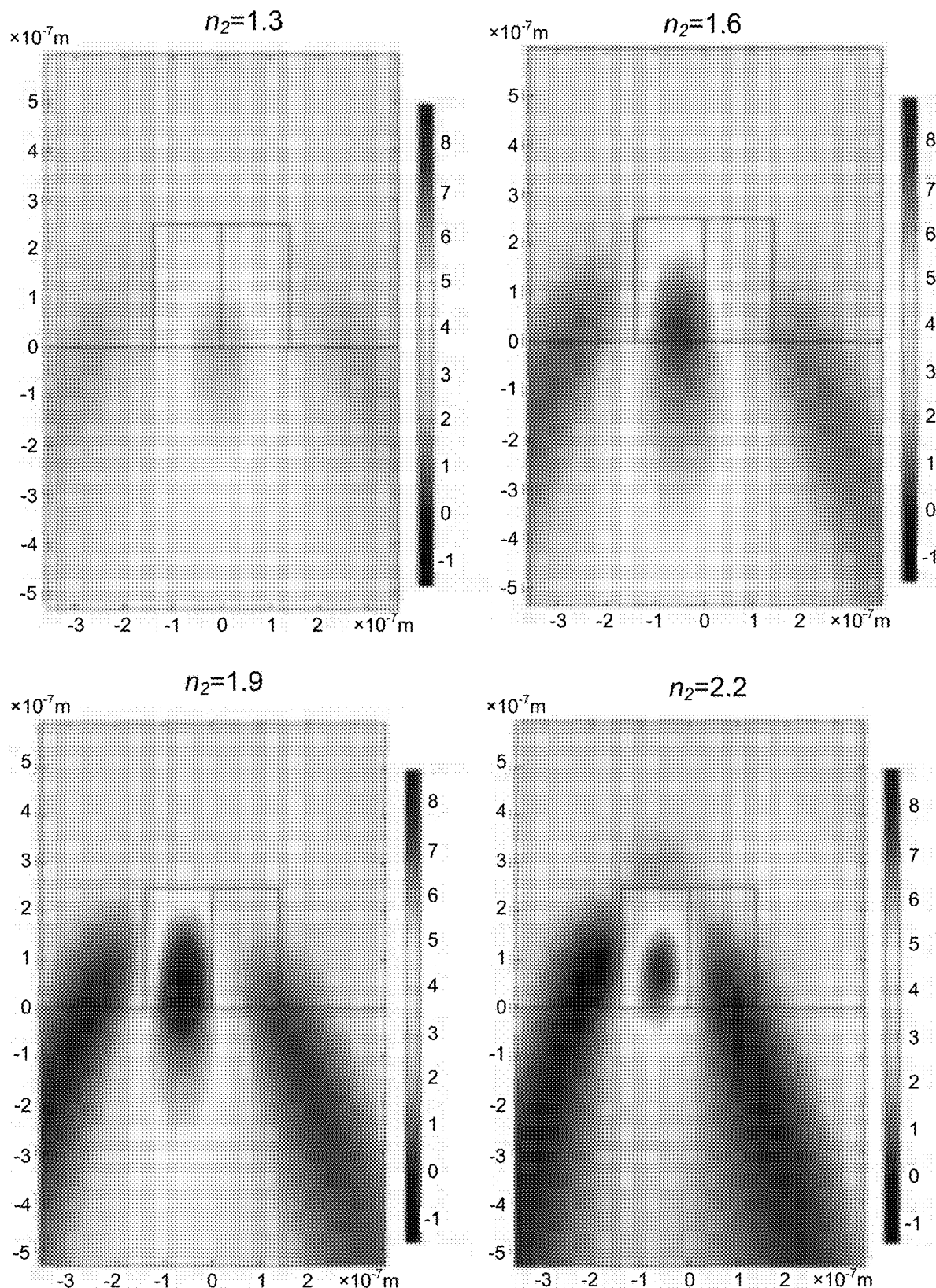
Figure 11B:
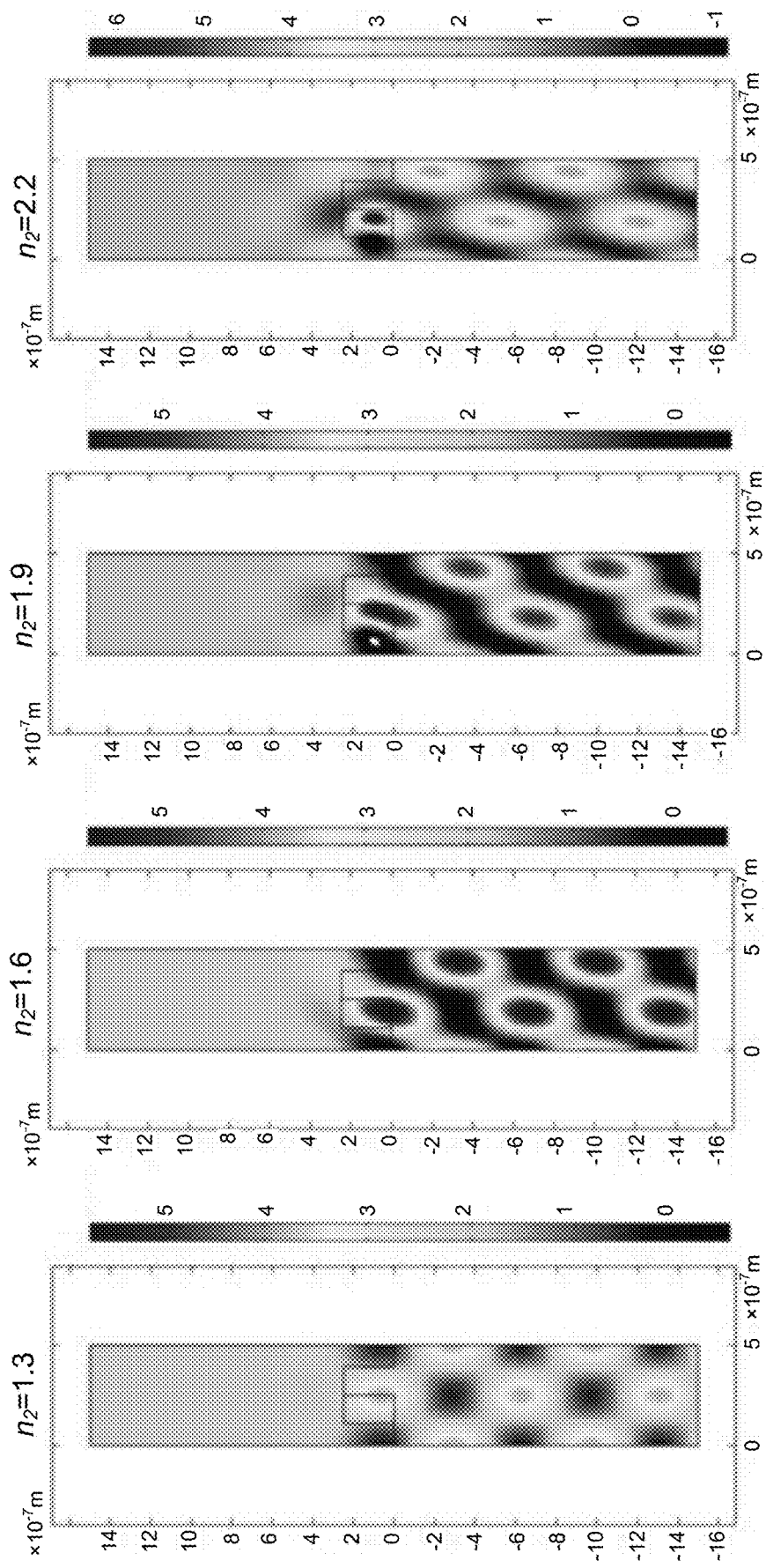
Figure 11C:
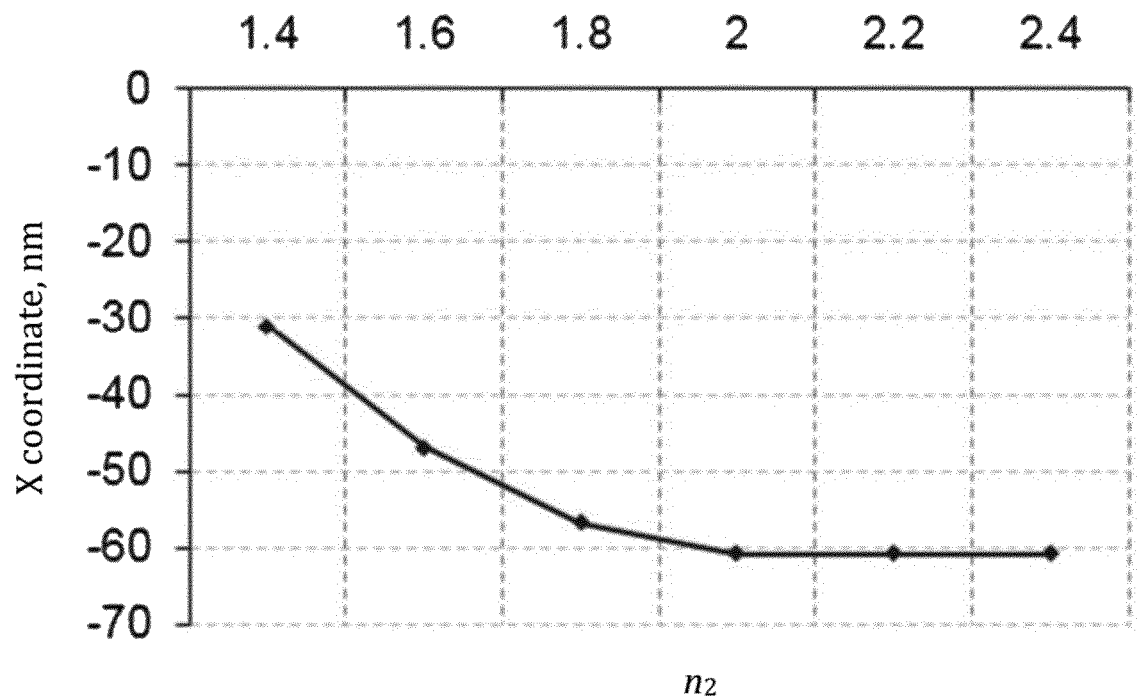
Figure 11D:
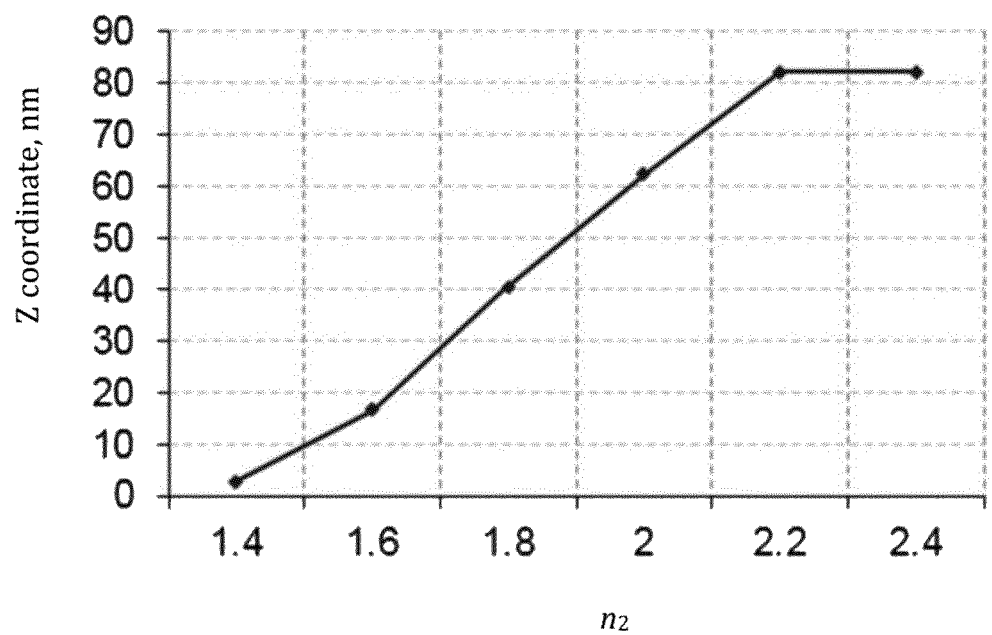
Figure 11E:
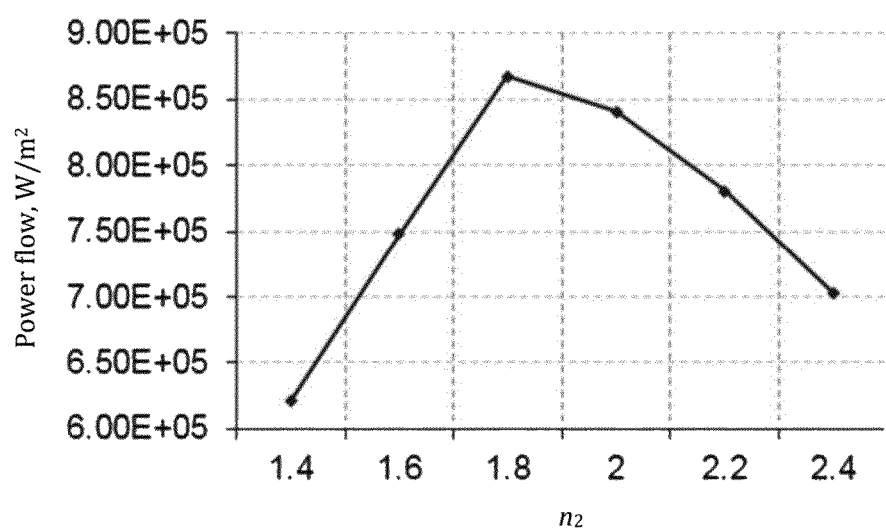

To understand NJ input into the redistribution phenomenon, we consider power flow distribution in xz-plane for the single double-material elements placed on a dielectric substrate (FIG. 11(a)) and periodic array of double material elements placed on a dielectric substrate (FIG. 11(b)) system with the parameters: $\lambda=620$ nm, d=500 nm, $W_1=W_2=140$ nm, H=250 nm, $n_3=n_4=1.3$ and 4 different values of refractive index $n_2$. The analysis of the dependence of position (X- and Z-coordinate (boundary between the substrate and element corresponds to Z=0, axis of the symmetry for the element corresponds to X=0) FIGS. 11(c,d)) and peak power density of the NJ hot spot in the case of single double-material element placed on the substrate on the refractive index $n_2$ shows that diffracted light has maxima when the position of the hot spot is close to the boundary between the element and substrate and intensity of the hot spot is maximal (see similarities between the curves for T1 (FIG. 11(a)) and Z-component of time averaged power flow (FIG. 11(e)).

In addition, to determine the dependence of the grating efficiency on the size of the elements, we consider the effect of the height H (FIG. 12) and width $W_1$ (FIG. 14) on the reflectance and transmittance of the light incident onto the double-material element grating. It can be seen, that due to the refraction of the jet waves by the walls of the layer with refraction index $n_2$ we can change the position and direction of the NJ beam at the boundary between the element and substrate (see FIG. 13) leading to the redistribution of the diffracted efficiency between 1st and −1st diffraction orders. Finally, we can conclude that for the lossless materials we do not have any restrictions for the height H. The width of the elements W is restricted by the period of the grating $d=/n_4 \sin \beta'$, where $\beta'$ is the angle corresponding to the ±1 orders. The optimal size of the element is $W_1 \cong \lambda_1/4$, where $\lambda_1 = \lambda/n_4$ (length of the wave in the material of substrate).

Such a diffraction grating consists in flat shallow structures. The advantage is ease of fabrication and robustness of the structure.

The system could be used in all optical systems that would need to deviate an image or some light with a microstructure, the advantage being simplicity of fabrication and robustness. Typical application domains are head-up displays, solar cell panels for maximizing light collection, OLED display light extraction, among many others.

The invention claimed is:

1. A diffraction grating comprising a substrate and a plurality of grating unit cells positioned on a surface of the substrate, wherein the grating unit cells form a periodic array of grating unit cells which are parallel to each other on said substrate surface, wherein said diffraction grating is associated with a three-dimensional Cartesian coordinates system defined by axis x, y and z, wherein the z-axis is normal to said diffraction grating, wherein a cross-section of each grating unit cell, in an xz plane, comprises a homogeneous dielectric host medium embedding at least a first block of a first dielectric material an edge of which along said z-axis is in direct contact with at least a second block of a second dielectric material, the host medium, the first dielectric material, and the second dielectric material having refractive indexes that are different from each other, wherein said plurality of grating unit cells provides a non symmetrical response for positive first diffraction order and negative first diffraction order based on hot spot positions of nanojets, the grating cells being configured to generate the nanojets at edges between the dielectric materials.

2. The diffraction grating according to claim 1, wherein said cross-section comprises:
 a first edge between said host medium and said first block along said z-axis that is targeted to form a first beam in a near field zone, being a first nanojet;
 a second edge between said first block and said second block along said z-axis that is targeted to form a second beam in said near field zone, being a second nanojet;
 a third edge between said second block and said host medium along said z-axis that is targeted to form a third beam in said near field zone, being a third nanojet, and wherein a shift of position along said x-axis and/or an angle of deviation from said z-axis in said xz plane of a total beam resulting from at least a partial combination of said first, second and third beams depends on the refractive indexes of the host medium, the first dielectric materil, and the second dielectric material, on widths and heights of said first and second blocks in said cross-section, and on base angles of the first and second blocks.

3. The diffraction grating according to claim 2, wherein said first beam is a tilted beam, and wherein a first angular position of a projection of said first beam in said xz plane depends on a ratio between the refractive indexes of the host medium and the first dielectric material.

4. The diffraction grating according to claim 2, wherein said second beam is a tilted beam, and wherein a second angular position of a projection of said second beam in said xz plane depends on a ratio between the refractive indexes of the first dielectric material and the second dielectric material.

5. The diffraction grating according to claim 2, wherein said third beam is a tilted beam, and wherein a third angular position of a projection of said third beam in said xz plane depends on a ratio between the refractive indexes of the host medium and the second dielectric material.

6. The diffraction grating according to claim 2, wherein said first and second blocks have equal widths along the x axis, and wherein said shift of position of said total beam along said x-axis depends on said refractive indexes of the host medium, the first dielectric material, and the second dielectric material and on widths and heights of said first and second blocks in said cross-section.

7. The diffraction grating according to claim 6, wherein a total width of said first and second blocks along said x-axis is smaller than or equal to an operating free-space wavelength of light normally incident on said diffraction grating.

8. The diffraction grating according to claim 1, wherein said first and second dielectric materials belong to the group consisting of:
 glass;
 plastic;
 a polymer material;
 oxide;
 nitride.

9. The diffraction grating according to claim 1, wherein said homogeneous dielectric host medium embeds a series of first and second blocks.

10. The diffraction grating according to claim 1, wherein the host medium has a refractive index in the range [1, 2.4], and the first and second dielectric materials have respective refractive indexes in the range [1.3, 2.4].

11. The diffraction grating according to claim 1, wherein a period of the grating is in a range from 300 nm to 1000 nm.

12. The diffraction grating according to claim 1, wherein the refractive index of the host medium is less than the refractive index of both the first and second dielectric materials.

13. The diffraction grating according to claim 1, wherein the first block and the second block each have a trapezoidal cross-section in the vertical xz plane, and the first block and the second block each have a top surface running parallel to a top surface of the substrate.

14. The diffraction grating according to claim 1, wherein the grating unit cells are oriented along a same axis.

15. The diffraction grating according to claim 1, wherein the first block and the second block have a same height along the z-axis.

16. A display device comprising:
a waveguide substrate;
a coupler comprising a diffraction grating, the diffraction grating comprising a substrate and a plurality of grating unit cells positioned on a surface of the substrate, wherein the grating unit cells form a periodic array of grating unit cells which are parallel to each other on said substrate surface, wherein said diffraction grating is associated with a three-dimensional Cartesian coordinates system defined by axis x, y and z, wherein the z-axis is normal to said diffraction grating, wherein a cross-section of each grating unit cell, in an xz plane, comprises a homogeneous dielectric host medium embedding at least a first block of a first dielectric material, an edge of which along said z-axis is in direct contact with at least a second block of a second dielectric material, the host medium, the first dielectric material, and the second dielectric material having refractive indexes that are different from each other,
wherein said plurality of grating unit cells provides a non symmetrical response for positive first diffraction order and negative first diffraction order based on hot spot positions of nanojets, the grating cells being configured to generate the nanojets at edges between the dielectric materials.

17. The display device according to claim 16, wherein the first block and the second block have a same height along the z-axis.

* * * * *